United States Patent
Dash et al.

(10) Patent No.: US 12,407,537 B2
(45) Date of Patent: Sep. 2, 2025

(54) NR-NR DUAL CONNECTIVITY (NR-DC) SECONDARY NODE (SN) DATA USAGE REPORTING

(71) Applicant: Radisys Corporation, Hillsboro, OR (US)

(72) Inventors: Nalinikanta Dash, Odisha (IN); Bhawani Sankar Satpathy, Odisha (IN); Rajendra Prasad Kodaypak, Hillsboro, OR (US)

(73) Assignee: Radisys Corporation, Hillsboro, OR (US)

( * ) Notice: Subject to any disclaimer, the term of this patent is extended or adjusted under 35 U.S.C. 154(b) by 344 days.

(21) Appl. No.: 17/933,094

(22) Filed: Sep. 17, 2022

(65) Prior Publication Data

US 2024/0097922 A1    Mar. 21, 2024

(51) Int. Cl.
    H04L 12/14    (2024.01)
    H04W 28/02    (2009.01)
    H04W 76/12    (2018.01)
    H04W 76/15    (2018.01)

(52) U.S. Cl.
    CPC ....... *H04L 12/145* (2013.01); *H04W 28/0268* (2013.01); *H04W 76/12* (2018.02); *H04W 76/15* (2018.02)

(58) Field of Classification Search
    CPC ......... H04L 12/14; H04L 27/00; H04L 27/26; H04L 5/00; H04L 1/00; H04L 5/14; H04L 43/08; H04W 28/02; H04W 76/15; H04W 76/12; H04W 76/16; H04W 76/20; H04W 36/00; H04W 36/08; H04W 36/14; H04W 48/02; H04W 48/18; H04W 72/12; H04W 72/14; H04W 28/08; H04W 28/09; H04W 24/04; H04W 24/10
    USPC ........................................................ 370/225
    See application file for complete search history.

(56) References Cited

U.S. PATENT DOCUMENTS

| | | | |
|---|---|---|---|
| 10,925,113 B2 * | 2/2021 | Gan | H04W 48/18 |
| 11,297,551 B2 * | 4/2022 | Ramle | H04W 36/0011 |
| 11,546,966 B2 * | 1/2023 | Gan | H04W 76/11 |
| 11,943,842 B2 * | 3/2024 | Gan | H04L 67/14 |
| 12,120,558 B2 * | 10/2024 | Youn | H04W 36/0022 |
| 2021/0368373 A1 * | 11/2021 | Youn | H04W 76/16 |
| 2023/0199595 A1 * | 6/2023 | Lu | H04W 36/12 370/329 |
| 2023/0337069 A1 * | 10/2023 | Shi | H04W 36/0044 |
| 2023/0362740 A1 * | 11/2023 | Schliwa-Bertling | H04W 36/0016 |
| 2023/0388268 A1 * | 11/2023 | Lu | H04L 67/51 |
| 2024/0048398 A1 * | 2/2024 | He | H04M 15/00 |
| 2024/0365272 A1 * | 10/2024 | Ninglekhu | H04W 76/34 |
| 2024/0381187 A1 * | 11/2024 | Lu | H04W 36/00222 |

* cited by examiner

*Primary Examiner* — Man U Phan
(74) *Attorney, Agent, or Firm* — Stoel Rives LLP

(57) ABSTRACT

Disclosed are techniques for reporting secondary node (SN) data usage in an NR-DC cellular communication for billing different tariffs of a UE's data usage over FR1 and FR2 bands provided by, respectively, a master node (MN) and a secondary node (SN). Also disclosed are details of the messages exchanged in various NR-DC architectures. In some embodiments, an SMF is configured for selecting a CHF from a CHF pool based on various factors.

16 Claims, 26 Drawing Sheets

| IE/Group Name | Presence | Range | IE type and reference | Semantics description | Criticality | Assigned Criticality |
|---|---|---|---|---|---|---|
| SN Data Usage Report Configuration | O | | | | YES | ignore |

| IE/Group Name | Presence | Range | IE type and reference | Semantics description |
|---|---|---|---|---|
| SN Data Usage Report Configuration | M | | | |
| CHOICE REPORTING | M | | ENUMERATED (Enable, Disable, ...) | |
| > Periodic Reporting Interval | | | INTEGER (0..86400, ...) | Unit: second |
| > Event-based Reporting | | | ENUMERATED (Release, Modification, All ...) | Indicates reporting when RAT resource is released via SN RELEASE REQUEST or modified via SN MODIFICATION REQUEST or both. |

| IE/Group Name | Presence | Range | IE type and reference | Semantics description | Criticality | Assigned Criticality |
|---|---|---|---|---|---|---|
| SN Data Usage Report Configured | O | | ENUMERATED (TRUE, ...) | Indicates the SN data usage report is enabled. | YES | ignore |

| IE/Group Name | Presence | Range | IE type and reference | Semantics description |
|---|---|---|---|---|
| PDU Session Usage Report | | | | |
| >Frequency Range Type | M | 0..1 | ENUMERATED (FR1,FR2) | |
| >PDU Session Timed Report List | M | | Volume Timed Report List | 1218 |
| QoS Flows Usage Report List | | 0..1 | | |
| >QoS Flows Usage Report Item | | 1..<maxnoofQoSflows> | | |
| >>QoS Flow Indicator | M | | | |
| >>Frequency Range Type | M | | ENUMERATED (FR1,FR2) | |
| >>QoS Flows Timed Report List | M | | Volume Timed Report List | 1218 |

FIG. 12

| IE/Group Name | Presence | Range | IE type and reference | Semantics description |
|---|---|---|---|---|
| Volume Timed Report Item | | 1.. <maxnoofTimePeriods> | | |
| >Start Timestamp | M | | OCTET STRING (SIZE(4)) | UTC time encoded in the same format as the first four octets of the 64-bit timestamp format as defined in section 6 of IETF RFC 5905 [37]. It indicates the start time of the collecting period of the included Usage Count UL IE and Usage Count DL IE. |
| >End Timestamp | M | | OCTET STRING (SIZE(4)) | UTC time encoded in the same format as the first four octets of the 64-bit timestamp format as defined in section 6 of IETF RFC 5905 [37]. It indicates the end time of the collecting period of the included Usage Count UL IE and Usage Count DL IE. |
| >Usage Count UL | M | | INTEGER (0..2^64-1) | The unit is: octets. |
| >Usage Count DL | M | | INTEGER (0..2^64-1) | The unit is: octets. |

| IE/Group Name | Presence | Range | IE type and reference | Semantics description | Criticality | Assigned Criticality |
|---|---|---|---|---|---|---|
| Message Type | M | | | | YES | ignore |
| AMF UE NGAP ID | M | | | | YES | ignore |
| RAN UE NGAP ID | M | | | | YES | ignore |
| PDU Session Resource SN Usage List | | 1 | | | YES | ignore |
| >PDU Session Resource SN Usage Item | | 1..<maxnoofPDUSessions> | | | | |
| >>PDU Session ID | M | | | | | |
| >>SN Data Usage Report Transfer | M | | OCTET STRING | Containing the Secondary Node Data Usage Report Transfer IE | | |
| Handover Flag | O | | ENUMERATED (handover_preparation, ...) | | YES | ignore |
| User Location Information | O | | | | YES | ignore |

FIG. 14

NR-NR DUAL CONNECTIVITY (NR-DC) SECONDARY NODE (SN) DATA USAGE REPORTING

TECHNICAL FIELD

This application relates generally to wireless communication systems, and more specifically to NR-DC.

BACKGROUND INFORMATION

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi.

In 3GPP radio access networks (RANs) in LTE systems, the base station can include a RAN node such as an Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). And in fifth generation (5G) wireless RANs, RAN nodes can include a 5G Node or NR node (also referred to as a next generation Node B or g Node B (gNB)).

RANs use a radio access technology (RAT) to communicate between the RAN node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

An Open Radio Access Network (O-RAN) is a disaggregated approach to deploying mobile fronthaul and midhaul networks built on cloud native principles. O-RAN is an evolution of the Next Generation RAN (NG-RAN) architecture, first introduced by the GSMA's 3GPP in their release 15 (5G version 1) technical specification TS 38.401. The O-RAN Alliance formed to undertake the advancement of NG-RAN philosophies, expanding on the scope of what was originally outlined by the 3GPP. An O-RAN includes an O-RAN radio unit (O-RU), an O-RAN distributed unit (O-DU), and an O-RAN central unit (O-CU).

Additional background information is available in the following 3GPP technical specifications: 3GPP TS 38.423: "NG-RAN; Xn Application Protocol (XnAP)"; 3GPP TS 37.340: "NR; Multi-connectivity; Overall description; Stage-2"; 3GPP TS 23.502: "Procedures for the 5G System (5GS)"; 3GPP TS 32.255: "Telecommunication management; Charging management; 5G data connectivity domain charging; Stage 2"; 3GPP TS 29.502: "5G System; Session Management Services; Stage 3"; 3GPP TS 38.413: "NG-RAN; NG Application Protocol (NGAP)"; and 3GPP TS 29.518: "5G System; Access and Mobility Management Services; Stage 3."

SUMMARY OF THE DISCLOSURE

Disclosed is a method, performed by a master node (MN) in an NR-DC cellular communication system including a secondary node (SN), of reporting SN data usage for billing different tariffs of a UE's data usage over FR1 and FR2 bands provided by the MN and the SN, respectively. The method includes receiving from the SN a first SN data usage report, the first SN data usage report representing the SN data usage by the UE, generating a second SN data usage report for an access management function (AMF), the second SN data usage report representing the SN data usage by the UE, and providing the second SN data usage report to the AMF to facilitate reporting of the SN data usage to a charging function and billing system. The method may also include sending to the SN an SN addition request or SN modification request including an SN data usage configuration to configure the reporting of the SN data usage. The method may also include the first SN data usage report representing the SN data usage per PDU session. The method may also include the first SN data usage report representing the SN data usage per QoS flow. The method may also include receiving, via an Xn interface with the SN, the first SN data usage report. The method may also include the MN and SN being central unit (CU) instances, and the method further includes receiving, via an Xn API with the SN, the first SN data usage report. These methods may be implemented in a computer-readable medium.

Also disclosed is a method, performed by a secondary node (SN) in an NR-DC cellular communication system including a master node (MN), of reporting SN data usage for billing different tariffs of a UE's data usage over FR1 and FR2 bands provided by the MN and the SN, respectively. The method includes receiving from the MN an SN data usage report configuration, generating, based on the SN data usage report configuration, an SN data usage report for the MN, and providing the SN data usage report to the MN to facilitate reporting of the SN data usage to a core network. The method may also include the SN data usage report configuration being in an SN addition request or SN modification request. The method may also include the SN data usage report having a PDU session resource SN data usage list. The method may also include the SN data usage report representing the SN data usage per QoS flow. The method may also include the first SN data usage report representing the SN data usage per PDU session. These methods may be implemented in a computer-readable medium.

Also disclosed is a method, performed by a session management function (SMF) in 5G core network of an NR-DC cellular communication system including a master node (MN) and secondary node (SN), of reporting SN data usage for billing different tariffs of a UE's data usage over FR1 and FR2 bands provided by the MN and the SN, respectively. The method includes receiving from an access management function (AMF) an Nsmf_PDUSession_UpdateSMContext message, the Nsmf_PDUSession_UpdateSMContext message including an SN data usage report representing the SN data usage by the UE, forwarding to a charging function (CHF) the SN data usage report, and providing to the AMF an Nsmf_PDUSession_UpdateSMContextResponse message. The method may also include selecting the CHF from a pool of available CHFs based on system attributes. The method may also include the SMF being a visited SMF (V-SMF) and forwarding to the charging function (CHF) the SN data usage report by signaling the H-SMF with an Nsmf_PDUSession_UpdateRequest message. The method may also include receiving UE location information with the SN data usage report, and determining whether to drop the SN data usage report based on the UE location information. The method may also include the SN data usage configuration configuring periodic reporting. The method may also include the SN data usage configuration configuring event-based reporting. The method may also include sending to the MN an SN addition request acknowledgement or SN modification request acknowledgement. The method may also include the system attributes having an indication of whether the UE is a home or roaming UE. The method may also include the system attributes having an indication of one or more of a service area, UPFs available in the serving area, a selected UPF and its N4 association, user location, online/offline charging, CHF node utilization, and traffic loading. The method may also include dropping a subsequent SN data usage report based on a roaming agreement between a home network operator and a visited network operator. These methods may be implemented in a computer-readable medium.

The mass deployments of software defined broadband access technologies by global service provider community will help in driving the eco-system and building a mobile networked society. This lays the foundation for the next generation of technologies and offers a huge opportunity for CSPs trying to find new ways of connecting everything including people, things, networks, devices and services. 5G operators are trying to leverage their spectrum resources optimally to design, build, deploy and commercialize their networks with new services and revenues. While several carriers are deploying 5G in the sub-6 GHz FR1 bands, some providers are also looking at FR2 based network solutions. Service providers can truly differentiate themselves in the industry based on their innovative revenue models which could be tied to their data usage transport, reporting, charging and billing. The ability to exchange per user data usage in FR2 vs. FR1 bands gives the operators significant advantage in their network infrastructure solutions in driving tiered, service and usage-based pricing. Having FR2-SN based reporting with FR1-MN as the anchor cell benefits carriers with CapEx/OpEx savings as it eliminates the need for direct control plane interface on the SN towards the core network. The disclosed embodiments also enable the operators to monitor, control, and decide how and when to report such data usage reports on a home or roaming PLMN basis from within the core network. The disclosed embodiment enables global service providers to securely expose data insights via open standards REST APIs from within the RAN and core networks towards external IT systems. Such insights are extremely useful to drive targeted OTT/value-added services and resulting revenues.

Additional aspects and advantages will be apparent from the following detailed description of embodiments, which proceeds with reference to the accompanying drawings.

BRIEF DESCRIPTION OF THE DRAWING FIGURES

To easily identify the discussion of any particular element or act, the most significant digit or digits in a reference number refer to the figure number in which that element is first introduced.

FIG. 8 is a table showing an SN data usage configuration message, according to one embodiment.

FIG. 9 is a table showing in greater detail the SN data usage configuration message of FIG. 8, according to one embodiment.

FIG. 10 is a table showing an SN data usage configured acknowledgement message, according to one embodiment.

FIG. 12 is a table showing information element (IE) details of an SN data usage information IE, according to one embodiment.

FIG. 13 is a table showing IE details of an item in a volume timed report list, according to one embodiment.

FIG. 14 is a table showing an SN data usage report message, according to another embodiment.

DETAILED DESCRIPTION OF EMBODIMENTS

Figure 1:
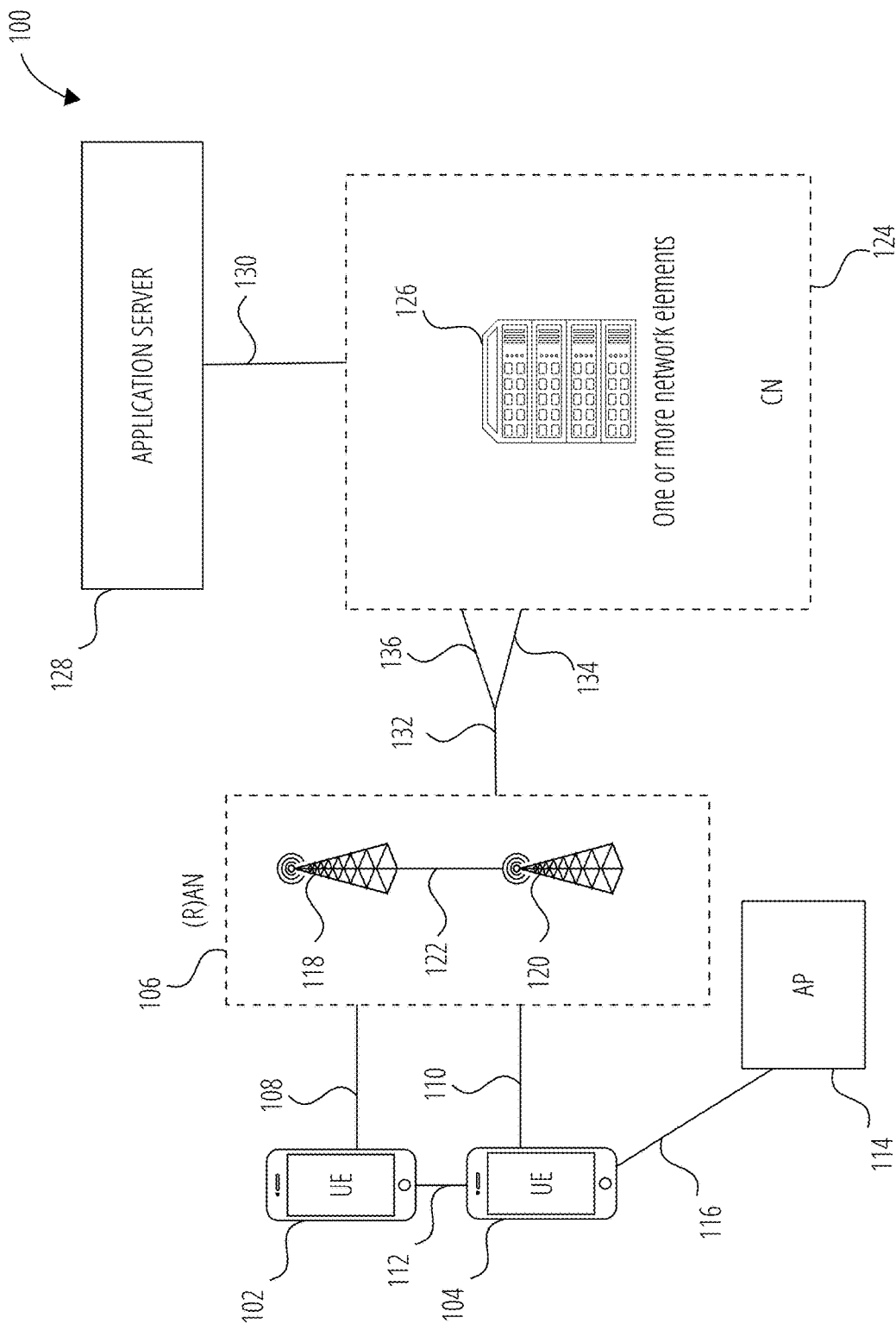
FIG. 1 is a block diagram of a wireless communications system, in accordance with one embodiment.

FIG. 1 illustrates an example architecture of a system 100 of a network, in accordance with various embodiments. The following description is provided for an example system 100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, system 100 includes UE 102 and UE 104. In this example, UE 102 and UE 104 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, UE 102 and/or UE 104 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

UE 102 and UE 104 may be configured to connect, for example, communicatively couple, with an access node or radio access node (shown as (R)AN 106). In embodiments, (R)AN 106 may be an NG RAN or a 5G RAN, an E-UTRAN, or a legacy RAN, such as a UTRAN or GERAN.

As used herein, the term "NG-RAN" or the like may refer to a (R)AN 106 that operates in an NR or 5G system, and the term "E-UTRAN" or the like may refer to a (R)AN 106 that operates in an LTE or 4G system. UE 102 and UE 104 utilize connections (or channels) (shown as connection 108 and connection 110, respectively), each of which comprises a physical communications interface or layer (discussed in further detail below).

In this example, connection 108 and connection 110 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, an NR protocol, and/or any of the other communications protocols discussed herein. In embodiments, UE 102 and UE 104 may directly exchange communication data via a ProSe interface 112. ProSe interface 112 may alternatively be referred to as a sidelink (SL) interface 112 and may comprise one or more logical channels, including but not limited to a PSCCH, a PSSCH, a PSDCH, and a PSBCH.

UE 104 is shown to be configured to access an AP 114 (also referred to as "WLAN node," "WLAN," "WLAN Termination," "WT" or the like) via connection 116. Connection 116 can comprise a local wireless connection, such as a connection consistent with any IEEE 802.11 protocol, wherein AP 114 would comprise a wireless fidelity (Wi-Fi®) router. In this example, AP 114 may be connected to the Internet without connecting to the core network of the wireless system (described in further detail below). In various embodiments, UE 104, (R)AN 106, and AP 114 may be configured to utilize LWA operation and/or LWIP operation. The LWA operation may involve UE 104 in RRC_CONNECTED being configured by RAN 118 or RAN 120 to utilize radio resources of LTE and WLAN. LWIP operation may involve UE 104 using WLAN radio resources (e.g., connection 116) via IPsec protocol tunneling to authenticate and encrypt packets (e.g., IP packets) sent over connection 116. IPsec tunneling may include encapsulating the entirety of original IP packets and adding a new packet header, thereby protecting the original header of the IP packets.

(R)AN 106 can include one or more AN nodes, such as RAN 118 and RAN 120, that enable connection 108 and connection 110. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG-RAN node" or the like may refer to a RAN node that operates in an NR or 5G system (for example, a gNB), and the term "E-UTRAN node" or the like may refer to a RAN node that operates in an LTE or 4G system 100 (e.g., an eNB). According to various embodiments, RAN 118 or RAN 120 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of RAN 118 or RAN 120 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN 118 or RAN 120); a MAC/PHY split wherein RRC, PDCP, RLC, and MAC layers are operated by the CRAN/vBBUP and the PHY layer is operated by individual RAN nodes (e.g., RAN 118 or RAN 120); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN 118 or RAN 120 to perform other virtualized applications. In some implementations, an individual RAN node may represent individual gNB-DUs that are connected to a gNB-CU via individual F1 interfaces (not shown by FIG. 1). In these implementations, the gNB-DUs may include one or more remote radio heads or RFEMs, and the gNB-CU may be operated by a server that is located in (R)AN 106 (not shown) or by a server pool in a similar manner as the CRAN/vBBUP. Additionally, or alternatively, one or more of RAN 118 or RAN 120 may be next generation eNBs (ng-eNBs), which are RAN nodes that provide E-UTRA user plane and control plane protocol terminations toward UE 102 and UE 104, and are connected to a 5GC via an NG interface (discussed infra). In V2X scenarios one or more of RAN 118 or RAN 120 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink (UL) and downlink (DL) communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

RAN 118 and/or RAN 120 can terminate the air interface protocol and can be the first point of contact for UE 102 and UE 104. In some embodiments, RAN 118 and/or RAN 120 can fulfill various logical functions for (R)AN 106 including, but not limited to, radio network controller (RNC) functions such as radio bearer management, uplink and downlink dynamic radio resource management and data packet scheduling, and mobility management.

In embodiments, UE 102 and UE 104 can be configured to communicate using OFDM communication signals with each other or with RAN 118 and/or RAN 120 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from RAN 118 and/or RAN 120 to UE 102 and UE 104, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, UE 102 and UE 104 and RAN 118 and/or RAN 120 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 300 MHz to approximately 3.8 GHz, whereas the unlicensed spectrum may include the 5 GHz band.

To operate in the unlicensed spectrum, UE 102 and UE 104 and RAN 118 or RAN 120 may operate using LAA, eLAA, and/or feLAA mechanisms. In these implementations, UE 102 and UE 104 and RAN 118 or RAN 120 may perform one or more known medium-sensing operations and/or carrier-sensing operations in order to determine whether one or more channels in the unlicensed spectrum are unavailable or otherwise occupied prior to transmitting in the unlicensed spectrum. The medium/carrier sensing operations may be performed according to a listen-before-talk (LBT) protocol.

LBT is a mechanism whereby equipment (for example, UE 102 and UE 104, RAN 118 or RAN 120, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 102, AP 114, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and an MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC are usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require UE 102 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to UE 102 and UE 104. The PDCCH carries information about the transport format and resource allocations related to the PDSCH channel, among other things. It may also inform UE 102 and UE 104 about the transport format, resource allocation, and HARQ information related to the uplink shared channel. Typically, downlink scheduling (assigning control and shared channel resource blocks to UE 104 within a cell) may be performed at any of RAN 118 or RAN 120 based on channel quality information fed back from any of UE 102 and UE 104. The downlink resource assignment information may be sent on the PDCCH used for (e.g., assigned to) each of UE 102 and UE 104.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as EREGs. An ECCE may have other numbers of EREGs in some situations.

RAN 118 or RAN 120 may be configured to communicate with one another via interface 122. In embodiments where system 100 is an LTE system (e.g., when CN 124 is an EPC), interface 122 may be an X2 interface. The X2 interface may be defined between two or more RAN nodes (e.g., two or more eNBs and the like) that connect to an EPC, and/or between two eNB s connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from an MeNB to an SeNB; information about successful in sequence delivery of PDCP PDUs to a UE 102 from an SeNB for user data; information of PDCP PDUs that were not delivered to a UE 102; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where system 100 is a 5G or NR system (e.g., when CN 124 is a 5GC), interface 122 may be an Xn interface. The Xn interface is defined between two or more RAN nodes (e.g., two or more gNBs and the like) that connect to 5GC, between a RAN 118 (e.g., a gNB) connecting to 5GC and an eNB, and/or between two eNBs connecting to 5GC (e.g., CN 124). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface, and mobility support for UE 102 in a connected mode (e.g., CM-CONNECTED) including functionality to manage the UE mobility for connected mode between one or more RAN 118 or RAN 120. The mobility support may include context transfer from an old (source) serving RAN 118 to a new (target) serving RAN 120; and control of user plane tunnels between an old (source) serving RAN 118 to a new (target) serving RAN 120. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be the same as or similar to the user plane and/or control plane protocol stack(s) shown and described herein.

(R)AN 106 is shown to be communicatively coupled to a core network—in this embodiment, CN 124. CN 124 may comprise one or more network elements 126, which are configured to offer various data and telecommunications services to customers/subscribers (e.g., users of UE 102 and UE 104) who are connected to CN 124 via (R)AN 106. The components of CN 124 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of CN 124 may be referred to as a network slice, and a logical instantiation of a portion of CN 124 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 128 may be an element offering applications that use IP bearer resources with the core network (e.g., UMTS PS domain, LTE PS data services, etc.). The application server 128 can also be configured to support one or more communication services (e.g., VoIP sessions, PTT sessions, group communication sessions, social networking services, etc.) for UE 102 and UE 104 via the EPC. Application server 128 may communicate with CN 124 through an IP communications interface 130.

In embodiments, CN 124 may be a 5GC. As described in 3GPP TS 23.501, 5G CN 124 includes an access and mobility management function (AMF), a user plane function (UPF), a session management function (SMF), an authentication server function (AUSF), a network exposure function (NEF), a unified data management (UDM), a unified data repository (UDR), a short message service function (SMSF), a non-3GPP interworking function (N3IWF), and other 5G core network functions. A charging function (CHF) introduced in the 5G system architecture allows charging services to be offered in connection with an operations support system and business support system (OSS/BSS).

(R)AN 106 may be connected with 5G CN 124 via an NG interface 132. In embodiments, NG interface 132 may be split into two parts, an NG user plane (NG-U) interface 134, which carries traffic data between RAN 118 or RAN 120 and a UPF, and S1 control plane (NG-C) interface 136, which is a signaling interface between RAN 118 or RAN 120 and AMFs.

In embodiments, CN 124 may be an EPC. Where CN 124 is an EPC, (R)AN 106 may be connected with CN 124 via an S1 interface 132. In embodiments, S1 interface 132 may be split into two parts, an S1 user plane (S1-U) interface 134, which carries traffic data between RAN 118 or RAN 120 and S-GW, and S1-MME interface 136, which is a signaling interface between RAN 118 or RAN 120 and MMEs.

Dual connectivity (DC) is a specific case of multi-connectivity (MC) in which a UE is connected to two APs. Multi-radio DC (MR-DC) in Release 16 is a generalization of different possible configurations of DC in which a multiple receive (Rx)/transmit (Tx) capable UE is configured to utilize resources provided by two different nodes connected via non-ideal backhaul. With the introduction of 5G NR, 3GPP introduced four configurations for MR-DC: one MR-DC with an EPC (E-UTRA-NR Dual Connectivity (EN-DC)) and three MR-DC with 5GC configurations (i.e., NR-E-UTRA Dual Connectivity (NE-DC), NG-RAN E-UTRA-NR Dual Connectivity (NGEN-DC) and NR-NR Dual Connectivity (NR-DC)). The first three MR-DC options fall under the non-standalone (NSA) architecture involving two APs of different RATs while the fourth MR-DC option (i.e., NR-DC) involves two NR next-generation nodeBs (gNB s).

Figure 2:
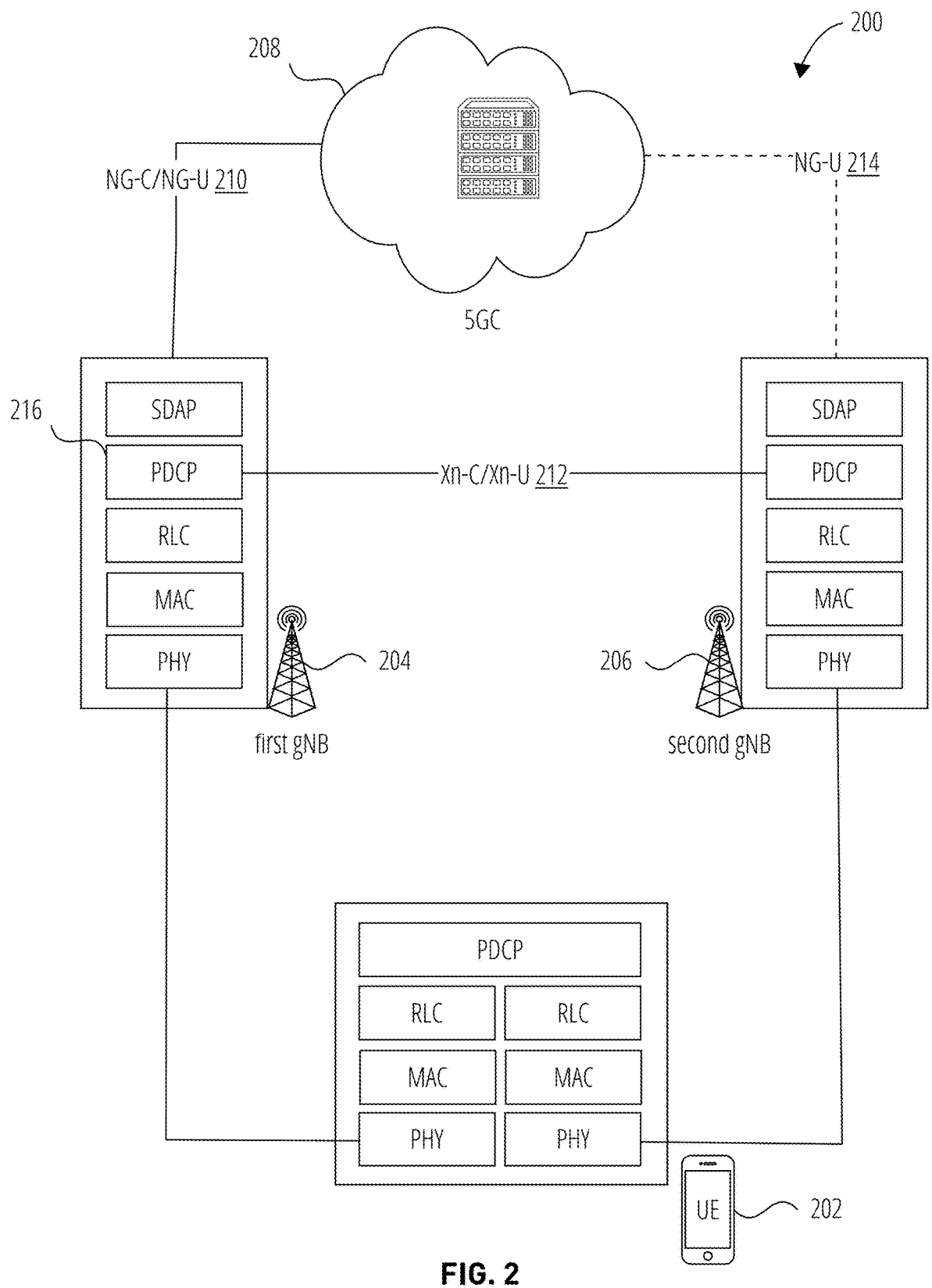
FIG. 2 is a block diagram of an NR-DC configuration, according to one embodiment.

FIG. 2 shows an Xn-based NR-DC architecture 200 in which a UE 202 is connected to a first gNB 204 acting as a master node (MN) and a second gNB 206 acting as a secondary node (SN). An MN in MR-DC is the RAN that provides the control plane connection to the core network. An SN in MR-DC is the RAN with no control plane connection to the core network, but providing additional resources to the UE. First gNB 204 is connected to a 5GC 208 via an NG control/user plane interface 210 and to second gNB 206 via an Xn control/user plane interface 212. Second gNB 206 might also be connected to 5GC 208 via an NG user plane interface 214. In Xn-based NR-DC architecture 200, a PDCP sublayer 216 used for the routing or aggregation is located in each gNB 204, 206 in a distributed fashion.

Current 3GPP standards and specifications address reporting SN data use only if both an MN and an SN belong to different RATs—they do not address such data usage reporting when both the MN and SN are in the same RAT (e.g., when both are in an NR deployment). Thus, the 3GPP standards do not address the SN data usage reporting in case both MN and SN belong to the same RAT, but with FR1 and FR2 bands. In 5G deployment scenarios, global carriers could benefit by having flexibility to deploy NR-DC with FR1 as MN and FR2 as SN. FR2 deployment provides very high data transfer speeds, which will have larger impacts in next-generation enterprise/private mobile networks. As the radio wave penetration in FR2 is much smaller when compared to FR1 frequency, the FR2 coverage would be limited. However, smart antenna beam forming methods can be used to improve the capacity and coverage for indoor usage as well.

Figure 3:
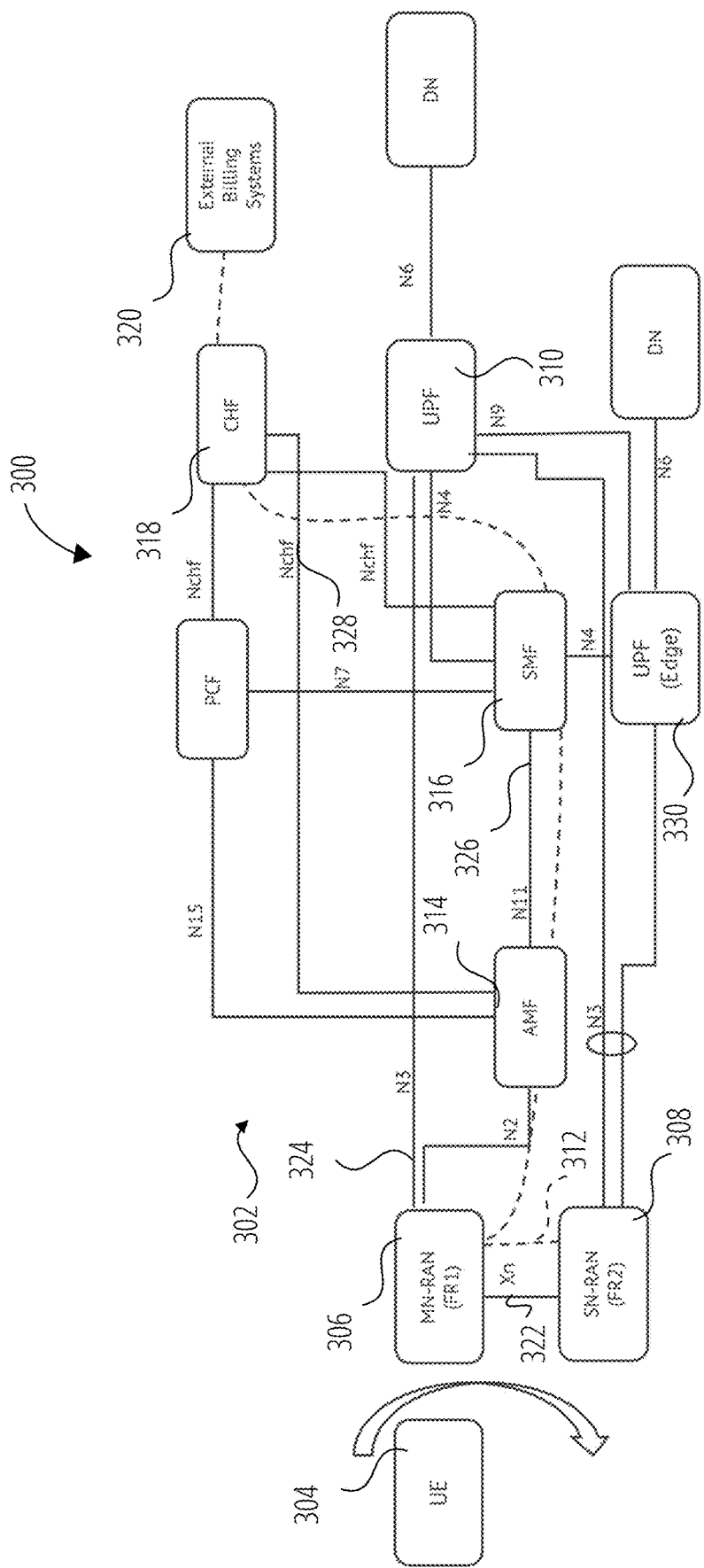
FIG. 3 is a block diagram showing in greater detail the NR-DC configuration of FIG. 2, according to one embodiment.

FIG. 3 shows an SN data usage reporting architecture 300 for reporting SN data use to a 5G core network 302 when both an MN and an SN are NR RATs supporting NR-DC. In the example of FIG. 3, NR-DC allows a UE 304 to connect to both a sub-6 GHz gNB (M-NG-RAN 306) for FR1 and an mmWave gNB (S-NG-RAN 308). By utilizing both sub-6 GHz and mmWave, NR-DC couples the broader reach of the mid-band with the faster speeds of mmWave.

Due to the nature of the master cell group (MCG) split or the secondary cell group (SCG) split configurations in RAN (described later with reference to FIG. 6), a UPF 310 is not aware of the exact data usage over each frequency range if the operator chooses to apply different tariffs for usage over FR1 and FR2. Hence, FIG. 3 shows a flexible and systematic reporting mechanism to exchange SN data usage if both M-NG-RAN 306 and S-NG-RAN 308 are served by different frequency ranges within the same NR-RAT, in order to have exact usage count over each frequency range to correctly generate usage-based charge. The purpose of an SN data usage report procedure is to provide information on the used resources of the SN.

Accordingly, FIG. 3 shows an SN data usage reporting flow 312 over the following nodes: S-NG-RAN 308 to M-NG-RAN 306, M-NG-RAN 306 to an AMF 314, AMF 314 to an SMF 316, SMF 316 to a CHF 318, and CHF 318 to an external OSS/BSS 320. For instance, S-NG-RAN 308 serving UE 304 in FR2 mode of operation triggers the data usage reports as UE 304 consumes data in the DL and UL for its bidirectional application flows. S-NG-RAN 308 sends the SN data usage report to M-NG-RAN 306 via Xn-C interface 322. M-NG-RAN 306 will then control the SN data usage report as M-NG-RAN 306 has an N2 interface 324 towards the core. Whether SN data usage reporting is needed would be known to M-NG-RAN 306, so M-NG-RAN 306 forwards the SN data usage report to AMF 314 via N2 interface 324. AMF 314 sends the report to SMF 316 via an N11 interface 326. In some embodiments, SMF 316 has a method of selecting CHF 318 (see, e.g., FIG. 21) and then forwards the SN data usage report to CHF 318 via an Nchf interface 328.

With the SN data usage reporting of FIG. 3, the service flow and usage-based charging over FR2 cells can be uniquely differentiated from FR1 and operators can drive new ways of enhancing their revenue streams as users move across the FR1/FR2 cells in the 5G coverage area. This technique could also help expose FR2 driven metrics from the RAN and core networks securely towards external service providers which will benefit them with data driven insights for targeted service enhancements.

Carriers would benefit by billing different tariffs for data usage over FR1 and FR2 bands due to band-specific unique radio capacity and coverage capabilities in a given location. Moreover, lack of mobility network infrastructure flexibility in data usage reporting per FR1 and FR2 bands in targeted cells inhibits carriers in providing better end-to-end customer experience. Performance metrics such as connection times, connection density, data throughput in downlink/uplink, latency, jitter, packet loss, download times, application QoE, etc., are all useful attributes beyond the basic 5G connectivity to inform customers for service adoption across the industry verticals. In order to differentiate in the industry and stay competitive, their infrastructure, interfaces between the RAN and core, and core and OSS/BSS systems, services and revenue models could be adapted.

Operators can plan to use FR2 for indoor cells only supporting bandwidth intensive applications in targeted geographic environments (capacity/coverage limited scenarios). M-NG-RAN 306 operating in FR1 frequency acts as an anchor node for control plane signaling exchange with core network along with data transfer, and this eliminates the need for a direct N2 interface in S-NG-RAN 308 towards the 5G core network. Thus, the FR2 cells can leverage an edge UPF 330 for QoE sensitive applications. Such a design will reduce backhaul CapEx/OpEx due to the core network signaling interactions via M-NG-RAN 306.

MNOs and other service providers are eager to deploy private 5G networks for enterprise use cases including factory automation, health care, smart factories, industry 4.0 environments, etc. With NR-DC deployments having FR1 and FR2 cells providing coverage in a geo-targeted area, the service providers can dynamically select an edge UPF within their UPF pools to process application QoE sensitive workloads during mobility to FR2 cells.

As soon as UE 304 enters enterprise premises/building, UE 304 is served with FR2 cell along with the previously anchored FR1 cell. As part of the control plane signaling from RAN towards AMF 314 within the core network, and its associated "PDU session resource modify request" procedure, SMF 316 could reselect a different UPF, such as edge UPF 330, closer to the FR2 cell for faster user plane packet delivery as soon as S-NG-RAN 308 gets added via Xn-C interface 322. SMF 316 could also utilize the same UPF, as an anchored UPF serving PDU sessions when connected via M-NG-RAN 306 for best effort data applications, if desired.

SMF 316 can intelligently select an edge UPF 330 using a reported UE location in PDU session resource modify request, using analytics from the core network data analytics function (NWADF), or based on local operator policies and provisioning. In general, edge UPF 330 keeps the tab on data usage count per user and this information gets forwarded to CHF 318 for appropriate charging based on volume reporting. CHF 318 can obtain FR2 cell information from SMF 316 via AMF 314. Due to the concept of data split at M-NG-RAN 306 and S-NG-RAN 308 (i.e., MCG split or SCG split), edge UPF 330 will not be able to keep a tab of exact amount of data usage by M-NG-RAN 306 and S-NG-RAN 308 and will report to CHF 318.

Figure 4:
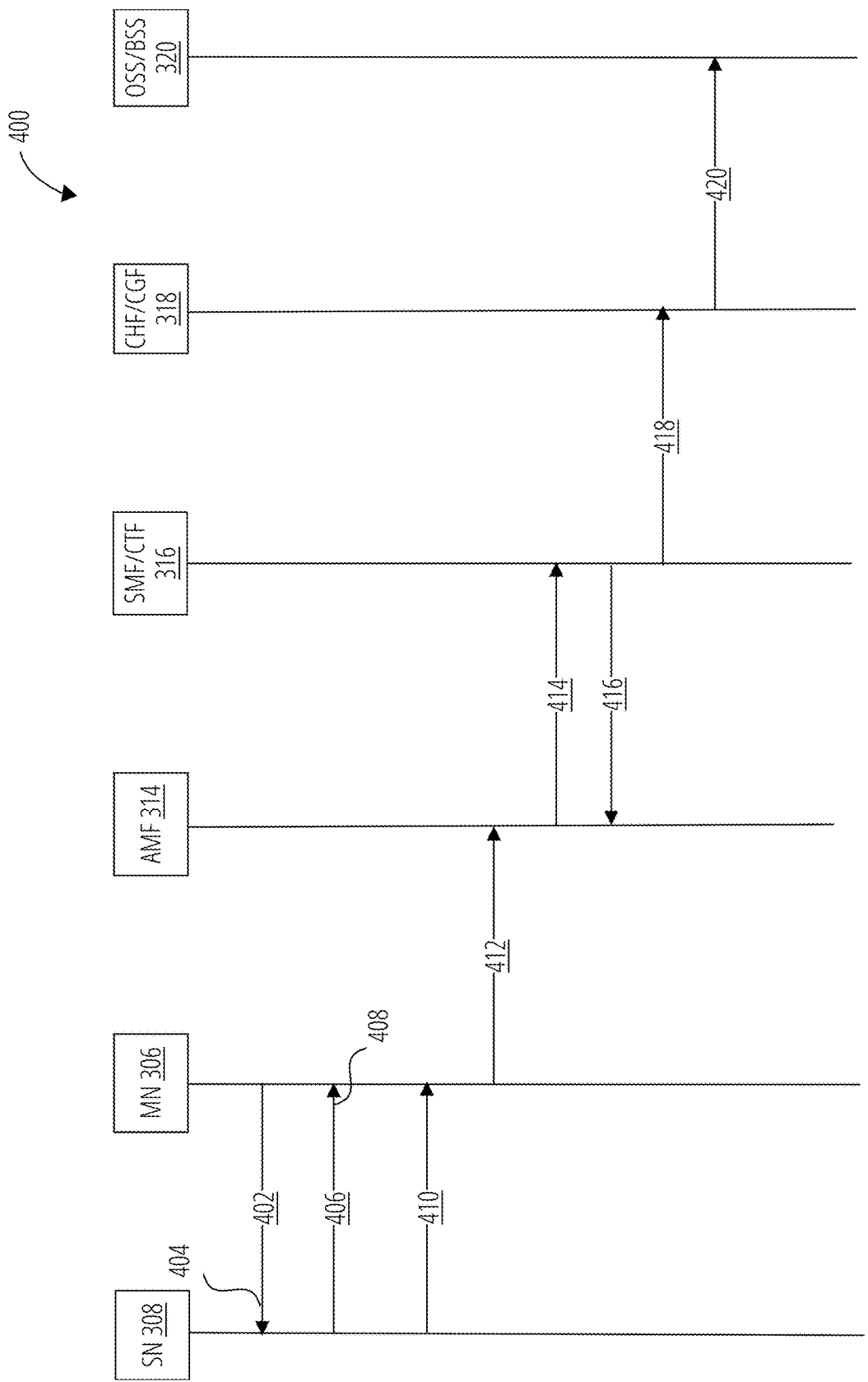
FIG. 4 is a message sequence diagram of SN data usage reporting, according to one embodiment.

FIG. 4 shows a message sequence 400 for configuring and providing an SN data usage report, according to one embodiment.

Initially, to configure SN data usage reporting, M-NG-RAN 306 sends to S-NG-RAN 308 an SN addition request or SN modification request 402 including as an information element (IE) an SN data usage report configuration IE 404 (see, e.g., FIG. 8 and FIG. 9). If S-NG-RAN 308 supports SN data usage reporting, then S-NG-RAN 308 applies the received SN data usage report configuration IE 404.

After applying SN data usage report configuration IE 404, S-NG-RAN 308 indicates whether SN data usage reporting is enabled in an SN addition request acknowledgement or SN modification request acknowledgement 406 that includes an SN data usage report configured IE 408 (see, e.g., FIG. 10).

Next, based on its configuration, S-NG-RAN 308 initiates the SN data usage reporting procedure by sending SN data usage report 410 (see, e.g., FIG. 11) towards M-NG-RAN 306. For instance, in some embodiments, S-NG-RAN 308 sends SN data usage report 410 periodically. In other embodiments, SN data usage report 410 is event triggered based on configuration received at S-NG-RAN 308. In some embodiments, SN data usage report 410 is a class 2 message for reporting data volumes usage over the SN, as shown and described later with reference to FIG. 11-FIG. 13. In a class 2 messaging procedure, the class 2 message is a unidirectional message and does not require an acknowledgement from the receiving entity.

Once it receives SN data usage report 410, M-NG-RAN 306 processes it to generate SN data usage report 412 that is sent to AMF 314 over the Ng interface (i.e., N2 interface 324 in the reference point representation of FIG. 3). Additional details on SN data usage report 412 are shown and described later with reference to FIG. 14.

Next, FIG. 4 shows SN data usage report 412 handling between AMF 314 and SMF 316. AMF 314 forwards the received SN data usage report 412 towards SMF 316 using Nsmf_PDUSession_UpdateSMContext 414. SMF 316 acknowledges Nsmf_PDUSession_UpdateSMContext 414 using message Nsmf_PDUSession_UpdateSMContextResponse 416.

FIG. 4 next shows SN data usage reporting between SMF 316 and CHF 318. SMF forwards received SN data usage report 418 from M-NG-RAN 306 towards CHF 318. This functionality of reporting SN data usage report at SMF 316 is valid in both home and roaming network (see, e.g., FIG. 15). The time interval used for the measurements reported (from M-NG-RAN 306) may be partitioned at SMF 316 to indicate usage that occurred before 126 after an absolute time. For instance, for a prepaid user, the data usage may have to be separated before 12 AM and after 12 AM in order to indicate daily usage limit. Volumes for the SN data usage report are reported to CHF 318 in addition to, and uncorrelated from, volumes of reported usage, which are undifferentiated between primary and secondary node. Considering both volumes would imply the same traffic to be counted twice.

Finally, FIG. 4 shows SN data usage reporting between CHF 318 and OSS/BSS 320. CHF 318 processes associated reports along with the data volumes consumed by UE 304 (FIG. 3) in DL/UL in the serving cell and forwards usage data 420 to external OSS/BSS 320. The billing systems of OSS/BSS 320 process the data usage reports to drive intelligent data insights.

Figure 5:
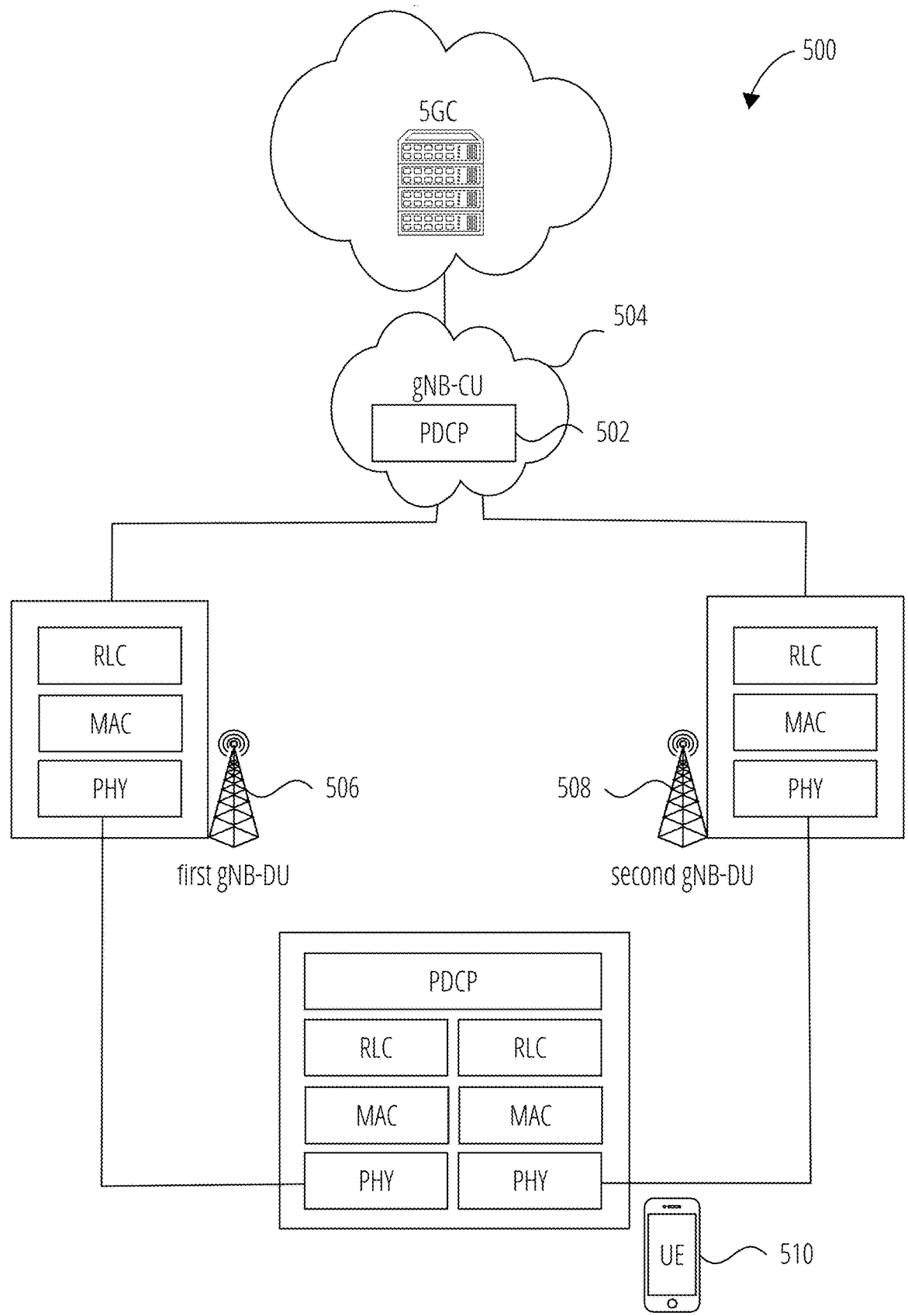
FIG. 5 is a block diagram of an NR-DC configuration, according to another embodiment.

FIG. 5 shows a fronthaul split-based NR-DC architecture 500 in which a PDCP sublayer 502 is located in a gNB-CU 504 in the cloud while all (sub)layers below PDCP sublayer 502 are located in a first gNB-DU 506 and a second gNB-DU 508. A UE 510 is connected to gNB-DUs 506, 508. In this example, both DUs 506, 508 are connected to gNB-CU 504 acting both as an MN and as an SN.

Figure 6:
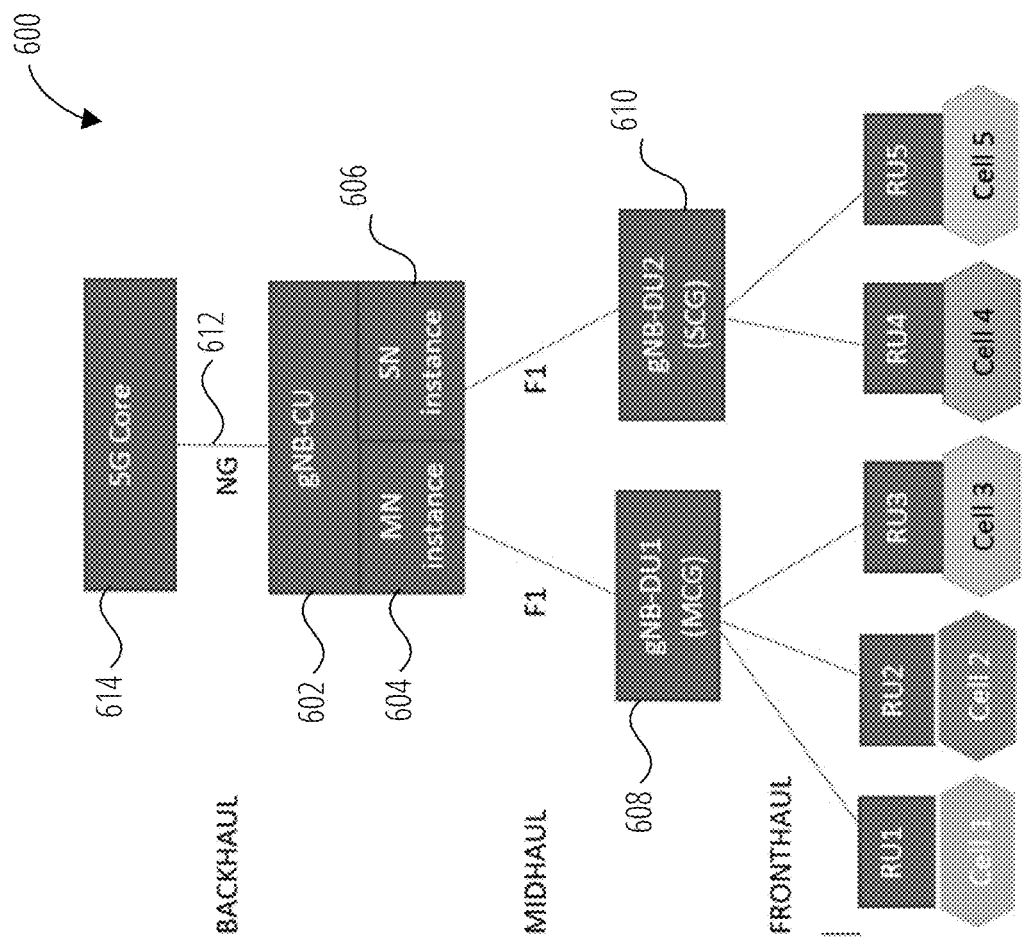
FIG. 6 is a block diagram showing in greater detail the NR-DC configuration of FIG. 5, according to one embodiment.

A master cell group (MCG) and secondary cell group (SCG) are also concepts under dual connectivity (DC). An MCG is a group of serving cells associated with the MN, comprised of a PCell and optionally one or more SCells, and can be understood as the group where the UE initiates random access (RACH). An SCG is a group of serving cells associated with the SN, comprised of the PSCell and optionally one or more SCells. For example, FIG. 6 shows in greater detail another fronthaul split-based NR-DC architecture 600 in which a gNB-CU 602 acts as both MN 604 and SN 606 for NR-DC. A UE (not shown) may connect to two gNB-DUs, in which a first gNB-DU 608 serves as the MCG and a second gNB-DU 610 serves as the SCG. Bearer options are shown and described with reference to FIG. 7.

In this type of fronthaul split-based NR-DC architecture 600, SN 606 instance of gNB-CU 602 is responsible to monitor and generate the SN data usage report. MN 604 instance of gNB-CU 602 is responsible for sending the SN data usage report, generated by the SN 606, over an NG interface 612 to a 5G core network 614.

For such architecture 600, SN data usage report handling should be enabled at once in gNB-CU 602, which is to be honored by both MN 604 instance and SN 606 instance. This means, if the SN data usage reporting is configured in gNB-CU 602, then SN 606 instance starts monitoring and generating SN data usage reports based on the configuration. Thus, MN 604 instance sends those SN data usage reports over NG interface 612 to 5G core network 614. A logical Xn-based API coordinates the entire process in the similar manner as it will be coordinated in SN data usage reporting architecture 300 (FIG. 3), when M-NG-RAN 306 and S-NG-RAN 308 belong to different gNBs and are connected over Xn-C interface 322.

Figure 7:
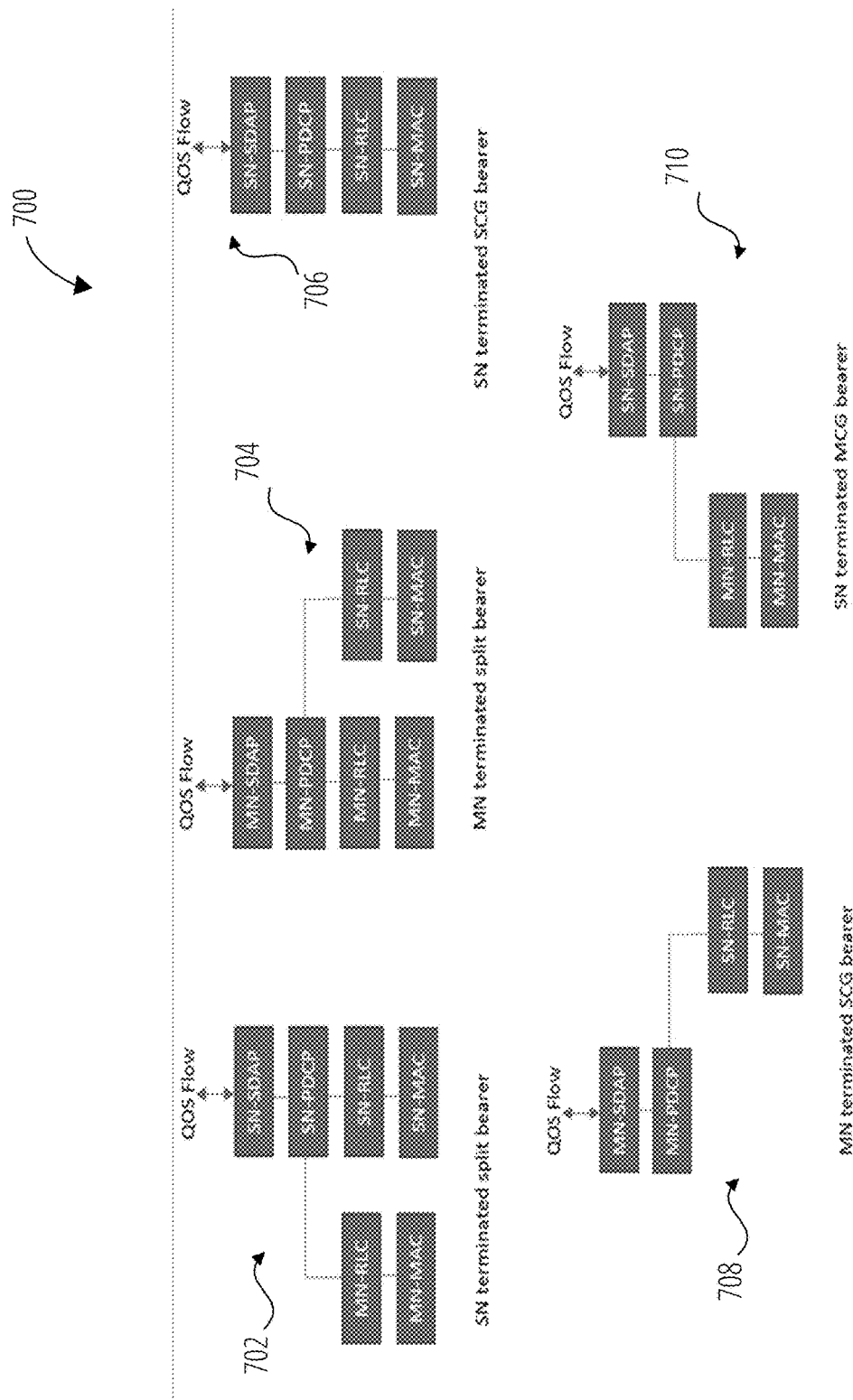
FIG. 7 is a set of block diagrams showing bearer options in NR-DC configurations, according to one embodiment.

FIG. 7 shows several bearer options 700 for NR-DC. For instance, bearer options 700 include an SN terminated split bearer 702, an MN terminated split bearer 704, an SN terminated SCG bearer 706, an MN terminated SCG bearer 708, and an MN terminated MCG bearer 710.

Figure 11:
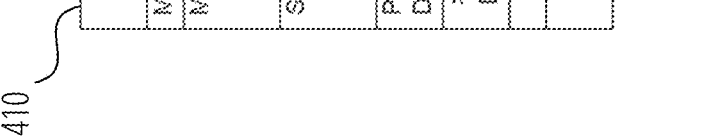
FIG. 11 is a table showing an SN data usage report message, according to one embodiment.

As shown in FIG. 11, SN data usage report 410 includes SN data usage information 1102 as an information element (IE). And FIG. 12 shows the contents and structure of SN data usage information 1102, according to one embodiment. For instance, SN data usage information 1102 provides information on the SN resources used by a PDU session within NR-DC.

FIG. 12 shows that SN data usage reporting can be done at PDU session level 1202 (i.e., in a PDU session usage report 1204) and per quality of service (QoS) flow level 1206 (e.g., using a QoS flow indicator (QFI) 1208 for a QoS flows usage report item 1210 in a QoS usage report list 1212), each of which includes a volume timed list (PDU session timed report list 1214 and QoS flows timed list 1216). This approach provides flexibility for operators to charge different tariffs for different services where each service is mapped to a different QFI. For instance, a user may employ enhanced mobile broadband (eMBB) services using non-guaranteed bit rate (non-GBR) bearer such as 5QI 9, and the user may employ ultra-reliable low latency communications (URLLC) services using delay critical GBR bearer such as 5QI 82.

FIG. 13 shows contents and structure of an item 1302 in a volume timed list 1218. This IE provides information on the data usage over an indicated period.

FIG. 14 shows contents and structure of SN data usage report 412 from M-NG-RAN 306 to AMF 314. As shown in FIG. 14, M-NG-RAN 306 may send SN data usage report 412 containing usage over different PDU sessions along with the different QFI configured for each PDU session. A PDU session resource SN usage item 1402 contains usage for each PDU session, and PDU session resource SN usage list 1404 contains all the PDU sessions. The hierarchy for a volume timed list is as follows: PDU session resource SN usage list 1404 PDU session resource SN usage item 1402→SN data usage information 1102 (see, e.g., FIG. 11 and FIG. 12)→PDU session usage report 1204 (see, e.g., FIG. 12)→PDU session timed report list 1214 (see, e.g., FIG. 12). For QoS based reporting, the hierarchy is as follows: PDU session resource SN usage list 1404→PDU session resource SN usage item 1402→SN data usage information 1102 (see, e.g., FIG. 11 and FIG. 12)→QoS usage report list 1212 (see, e.g., FIG. 12)→QoS flows usage report item 1210 (see, e.g., FIG. 12)→QoS flows timed list 1216 (see, e.g., FIG. 12).

For each PDU session for which PDU session resource SN usage list 1404 is included in an SN data usage report 410, an SMF acts according to the process described with reference to FIG. 4 and FIG. 15.

M-NG-RAN 306 may report user location information 1406 within SN data usage report 412 in order to indicate location of a UE. Within user location information 1406 IE, M-NG-RAN 306 may report the location of both the MN and the SN. For the MN, user location information 1406 IE may include NR cell global identity (CGI) and tracking area identity (TAI). For the SN, user location information 1406 IE may include PSCell Information (NR-CGI of SN). Additionally, NG-RAN M-NG-RAN 306 may report user location information 1406 within SN data usage report 412 in order to indicate the location of the UE, which may be used by SMF 316 to determine if received SN data usage report 412 needs to be sent towards CHF 318 or should be dropped.

M-NG-RAN 306 node will send one SN data usage report 412 for a UE when the UE is subject to handover by RAN. SN data usage report 412 includes a handover flag 1408 to indicate when the message being sent is triggered by a handover. If handover flag 1408 is included in SN data usage report 412, it indicates that, for each PDU session, AMF 314 should buffer an SN data usage report transfer 1410 IE since SN data usage report 412 is sent due to a handover.

Figure 15:
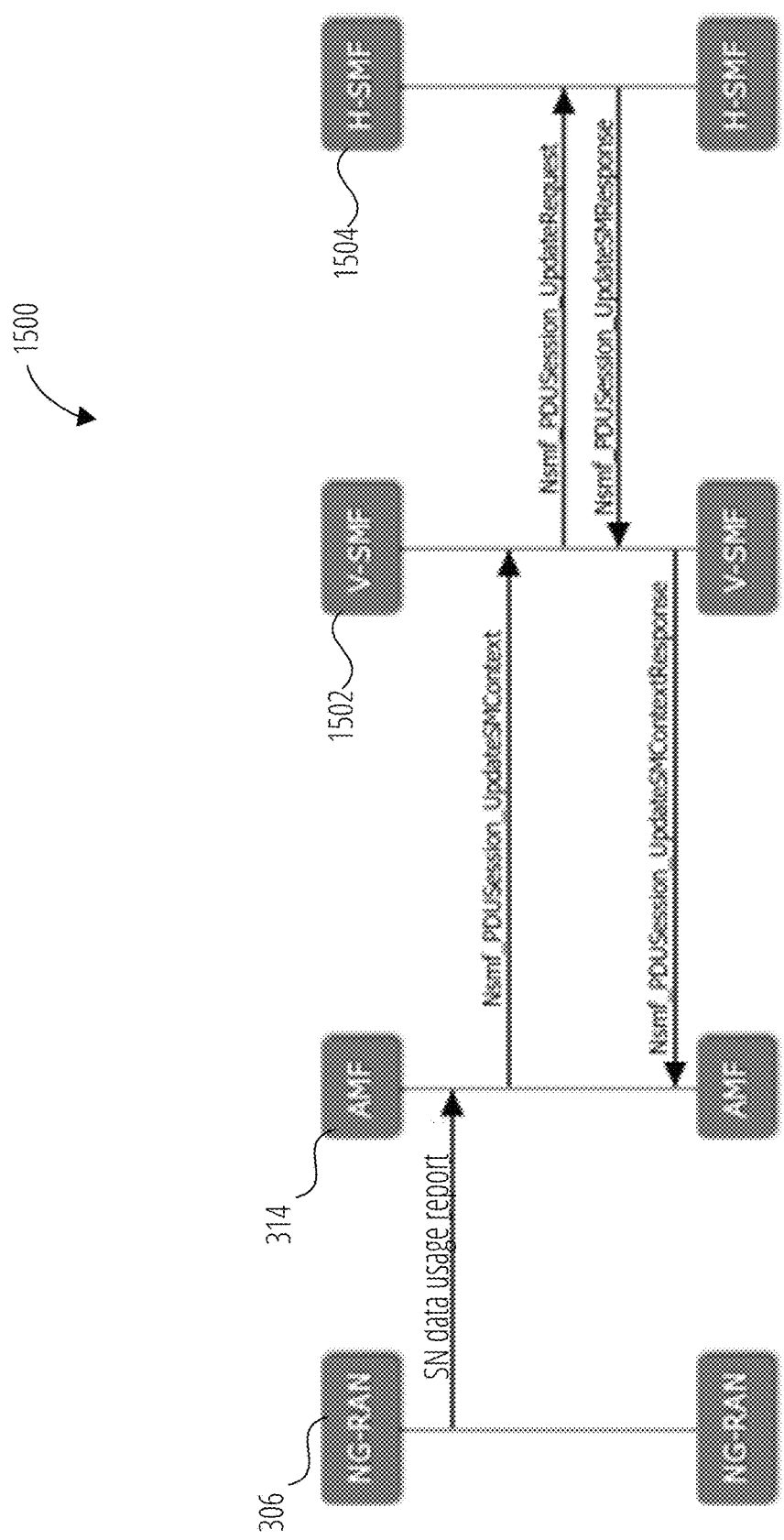
FIG. 15 is a message sequence diagram of SN data usage report handling in a roaming scenario, according to one embodiment.

FIG. 15 shows a message sequence 1500 for SN data usage report handling between AMF 314 and a visited SMF (V-SMF 1502) in a roaming scenario. Based on roaming policy agreement between home network operator and visited network operator, a home SMF (H-SMF 1504) may intelligently choose to not forward a received SN data usage report towards CHF 318. In a roaming scenario, based on a roaming agreement between home and visited network operator, V-SMF 1502 may intelligently choose to drop the SN data usage report.

Figure 16:
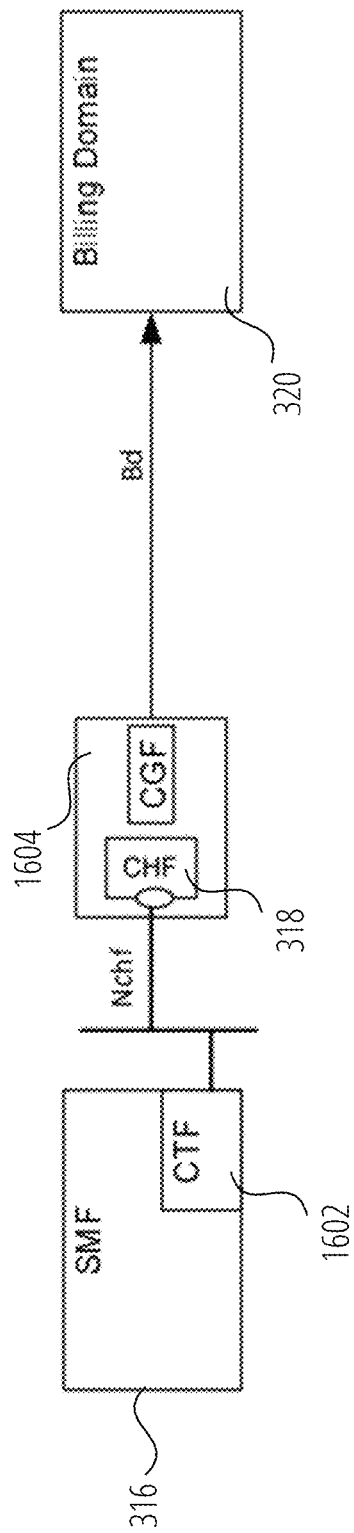
FIG. 16 is a block diagram showing in greater detail SN data usage report handling shown in FIG. 4, according to one embodiment.
Figure 17:
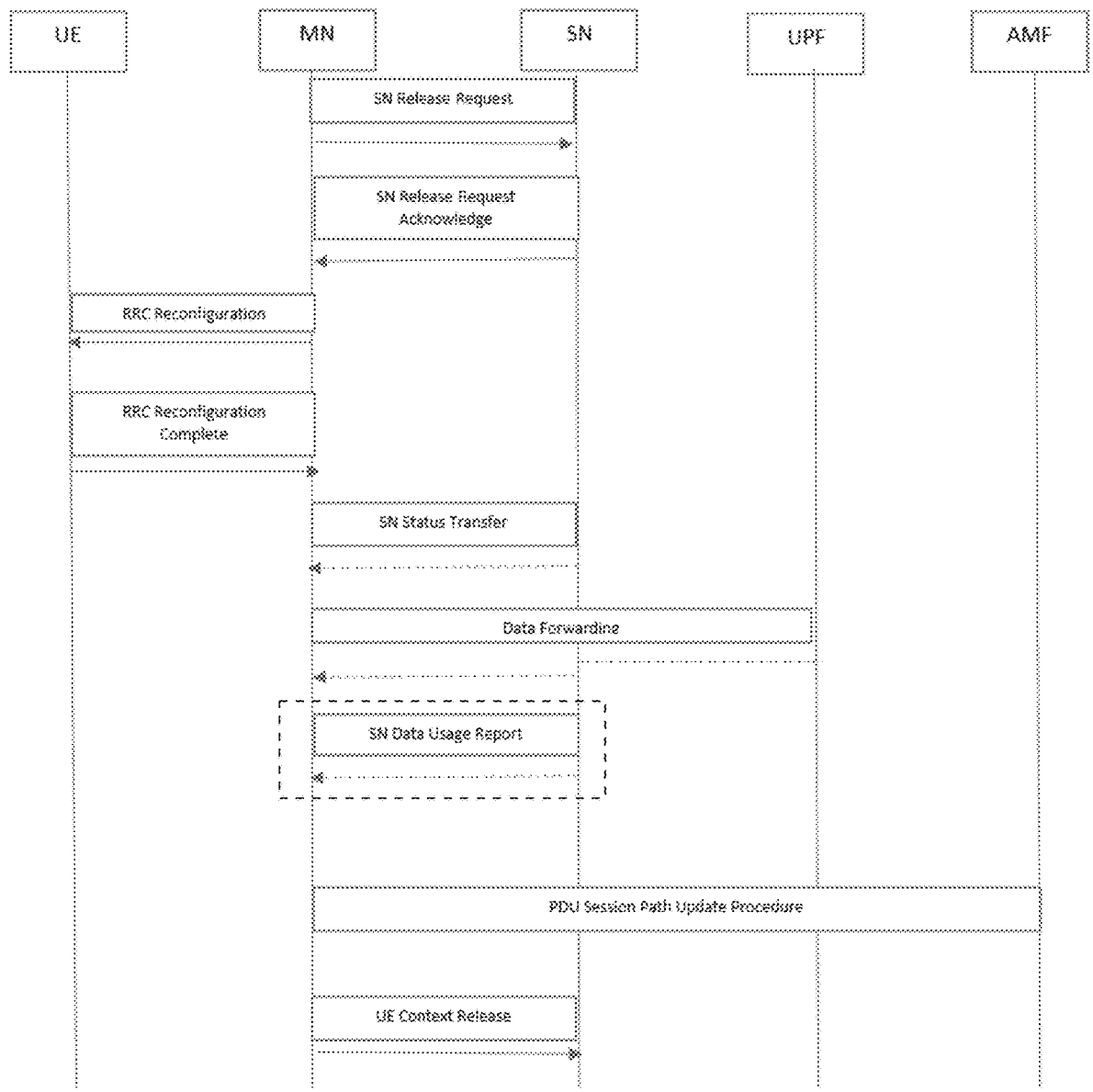
FIG. 17 is a message sequence diagram showing an MN-initiated SN release with SN data usage reporting, according to one embodiment.
Figure 18:
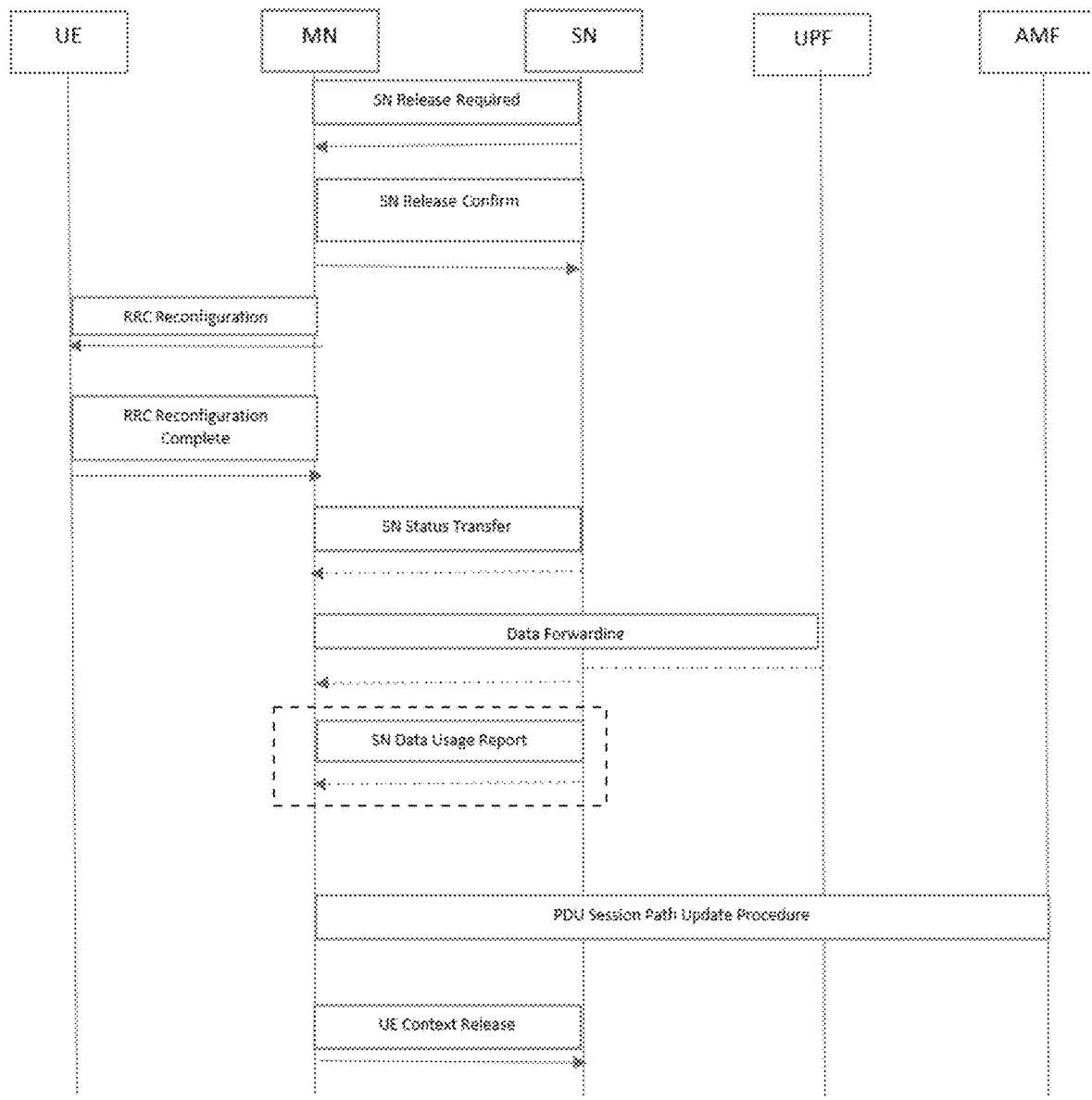
FIG. 18 is a message sequence diagram showing an SN-initiated SN release with SN data usage reporting, according to one embodiment.
Figure 19:
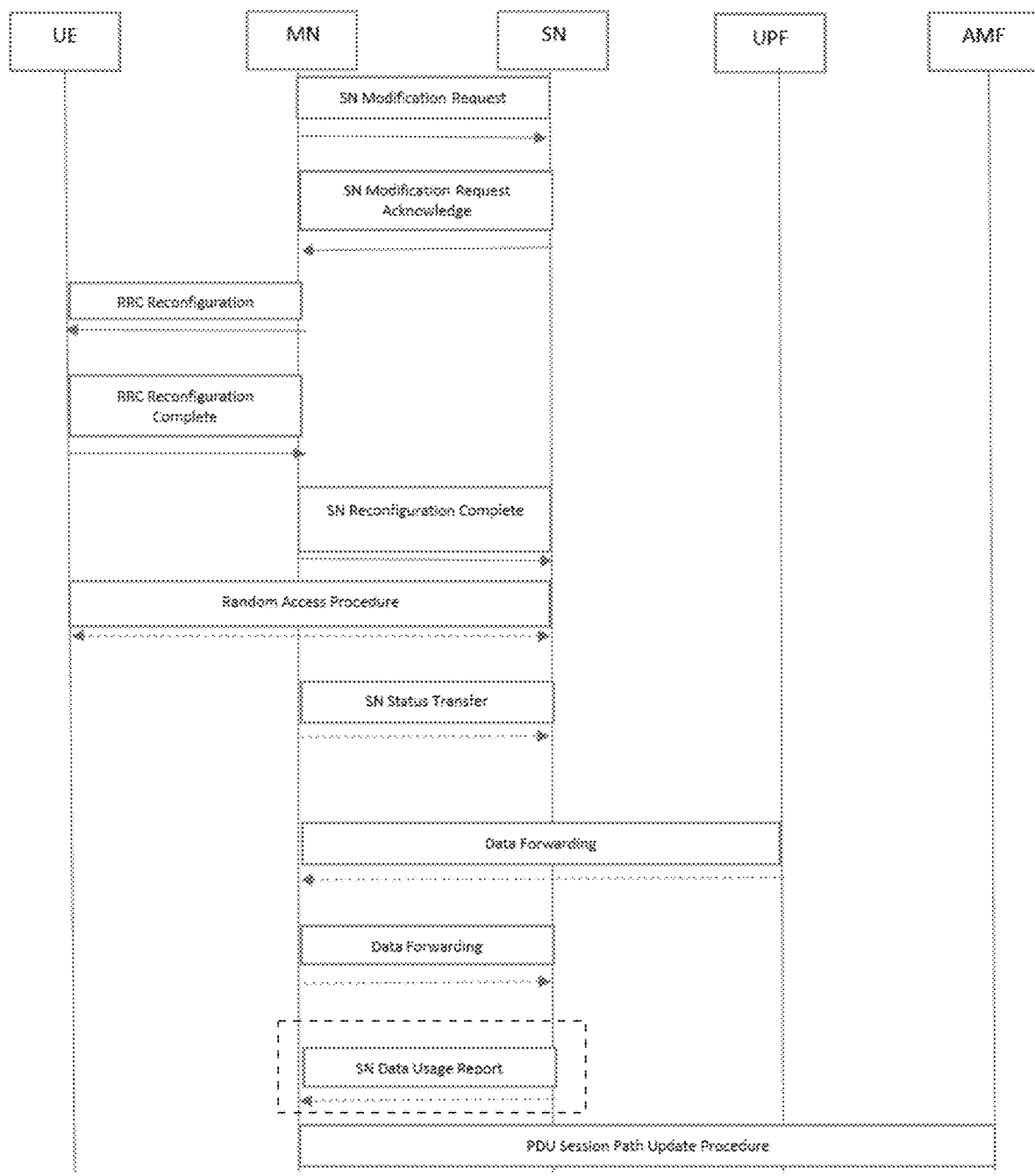
FIG. 19 is a message sequence diagram showing an MN-initiated SN modification with SN data usage reporting, according to one embodiment.
Figure 20:
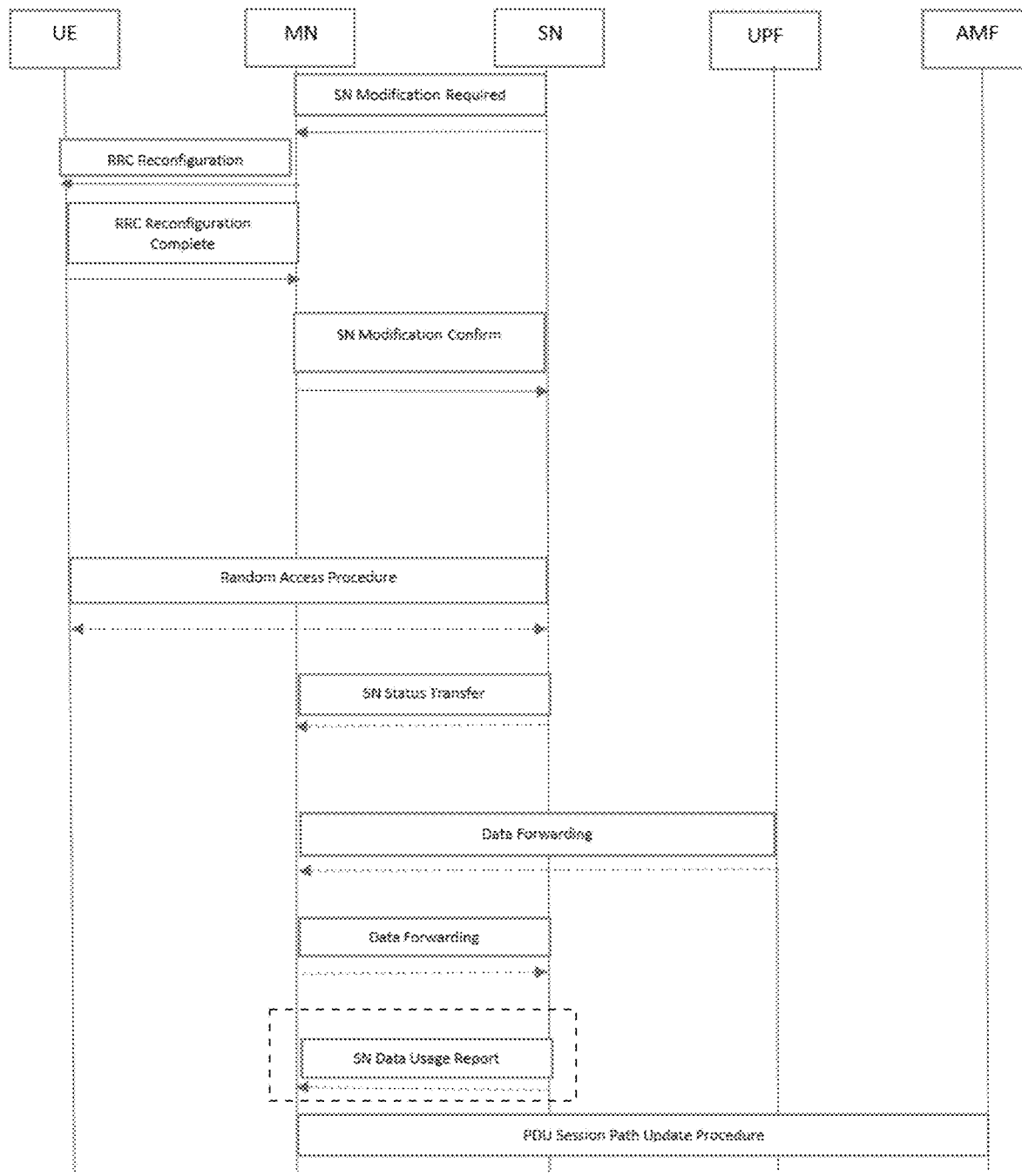
FIG. 20 is a message sequence diagram showing an SN-initiated SN modification with SN data usage reporting, according to one embodiment.

FIG. 16 shows, in greater detail, SMF 316 including a charging trigger function (CTF 1602) and CHF 318 integrated with a charging gateway function (CGF 1604). CGF 1604 provides a mechanism to transfer charging information or charging data records (CDRs) from network elements to a downstream system, i.e., a billing system.

FIG. 17, FIG. 18, FIG. 19, and FIG. 20 show how, before an SN is released or modified, SN data usage report 410 is provided to M-NG-RAN 306. Thus, M-NG-RAN 306 may generate SN data usage report 412, as described previously.

Figure 21:
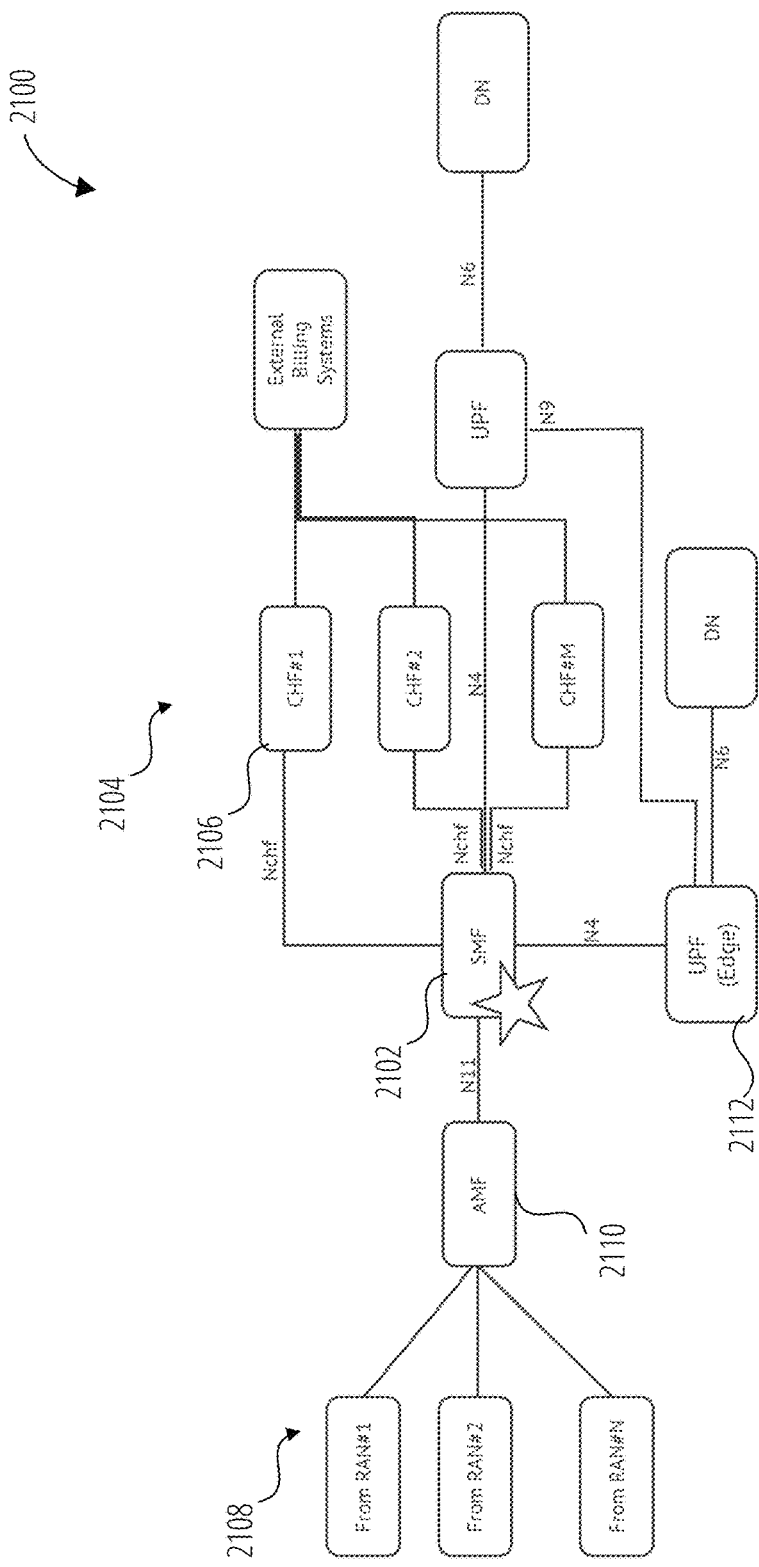
FIG. 21 is a block diagram of another SN data usage reporting architecture showing selection of a charging function, according to one embodiment.

FIG. 21 shows another SN data usage reporting architecture 2100, in which SMF 2102 intelligently selects one CHF from a pool of CHFs 2104 for SN data usage reporting. SMF 2102 intelligently selects a CHF 2106, for processing secondary node data usage reports, based on various system attributes including subscriber status (home vs. roaming users), service area, UPFs available in the serving area, selected UPF and its N4 association, user location, online/offline charging, CHF node utilization and traffic loading, or other factors. SMF 2102 also may consider additional criteria for selecting one of CHFs 2106 such as: latency requirement to facilitate real time online billing with SLA, load balancing to avoid saturation of any single CHF, processing capabilities of a CHF (as some of the CHF processing capabilities will be more powerful than others in a CHF pool), or NWDAF based data insight CHF selection.

For instance, according to one example, SMF 2102 selects CHF 2106 based on user location information 1406 (FIG. 14) (ULI) received from an NG-RAN 2108 via an AMF 2110. As described previously, ULI may include both NR-CGI and TAI.

If SMF 2102 receives a ULI with cells that are being served by an edge UPF 2112 and NR-DC is configured, then SMF 2102 may choose one of CHFs 2106 that supports SN data usage report processing, as the operator may choose not to deploy all CHF with SN data usage report processing capabilities.

Once SMF 2102 selects a CHF, it will keep it in its cache until network conditions change and new CHF selection criteria arise such as SW upgrade, it is taken down for maintenance, it is running closer to its capacity, or other factors.

SMF 2102 may choose to silently discard or forward received SN data usage reports towards CHF 2106 such as different tariffs not required to be applied for usage over SN, defined QoS criteria not met with, usage report associated with low priority data flows, or other factors.

SMF 2102 may forward a received SN data usage report periodically or based on event triggering such as user location of UE changes, UPF relocation, addition of new service flows, or other events.

SMF 2102 may or may not decide to forward the secondary node reports received from NG-RAN 2108 and AMF 2110 nodes based on additional intelligence such as use of specific UPFs, its internal policies, subscription profiles, etc. A CHF may poll the serving UPF to get usage data information.

Figure 22:
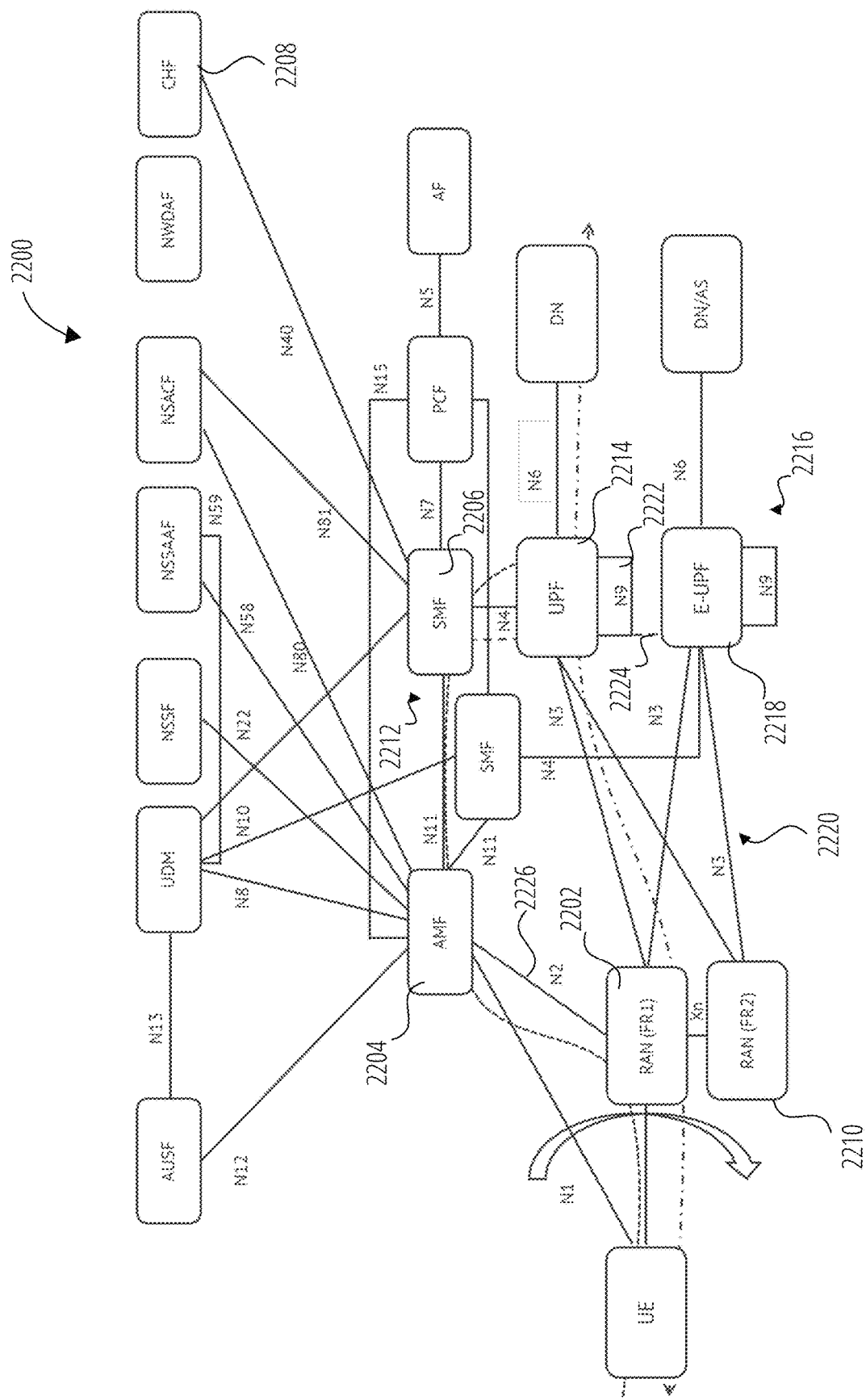
FIG. 22 is a block diagram showing an NR-DC use case with an edge UPF (E-UPF) deployment, according to one embodiment.

FIG. 22 shows another NR-DC deployment configuration 2200. As described in previous embodiments, an M-NG-RAN 2202 communicates with an AMF 2204 via a N2 interface 2226, which communicates with an SMF 2206, and which communicates with a CHF 2208. An S-NG-RAN 2210 (serving FR2) communicates with M-NG-RAN 2202 (serving FR1) for SN data usage reporting to be sent to CHF 318 via AMF 314 and SMF 2206 network functions for usage driven charging and billing.

In this example, AMF 2204 can select SMF 2206 from an SMF pool 2212, based on a variety of system attributes including UE's location, tracking area, SMF loading or traffic utilization, proximity, latency, or other factors. Also, SMF 2206 can select a UPF 2214 from a UPF pool 2216, based on a variety of system attributes including service area, UE location, UPF serving a given service area, UPF utilization, proximity, UPFs with charging capabilities, or other factors, etc. The selected UPF can be a centralized function (e.g., anchored UPF 2214) or a dedicated edge function (e.g., E-UPF 2218) specifically designed to meet bandwidth intensive data transport needs of FR2 cells. In some embodiments, SMF 2206 selects central UPF 2214 or E-UPF 2218 based on additional intelligence in the network taking into account the end user mobility dynamics. In some embodiments, E-UPF 2218 is configured to communicate with M-NG-RAN 2202 and S-NG-RAN 2210 directly via an N3 interface 2220, and with central UPF 2214 via an N9 interface 2222. E-UPF 2218 and central UPF 2214 communicate with selected CHF 2208 via SMF 2206 using an N4 interface 2224 to ensure data usage reports are delivered to the targeted CHF 2208 for appropriate charging and billing purposes.

Figure 23:
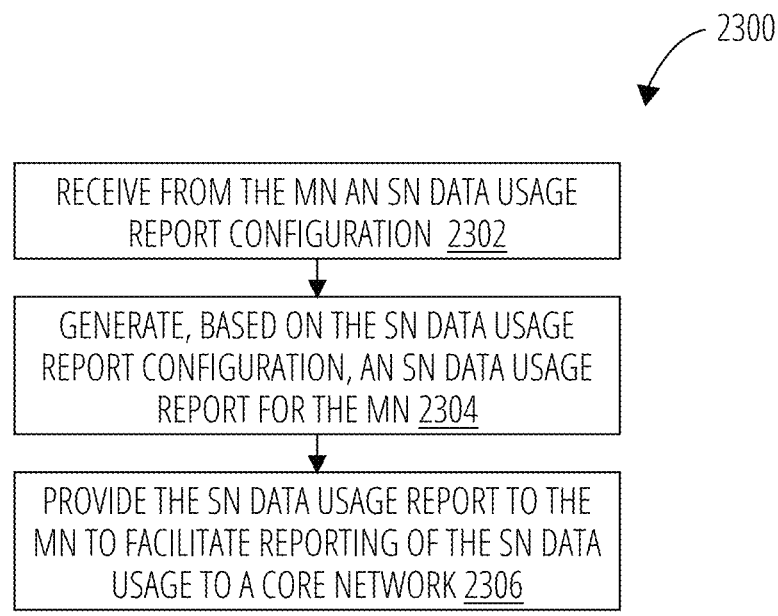
FIG. 23 is a flowchart of a process for billing different tariffs of a UE's data usage over FR1 and FR2 bands provided by the MN and the SN, respectively, in accordance with one embodiment.

FIG. 23 shows a process 2300, performed by an MN in an NR-DC cellular communication system (see, e.g., architecture 300 or architecture 600) including an SN, of reporting SN data usage for billing different tariffs of a UE's data usage over FR1 and FR2 bands provided by MN and SN, respectively. In a block 2302, process 2300 receives from MN an SN data usage report configuration. In a block 2304, process 2300 generates, based on the SN data usage report configuration, an SN data usage report for the MN. In a block 2306, process 2300 provides the SN data usage report to the MN to facilitate reporting of the SN data usage to core network.

Figure 24:
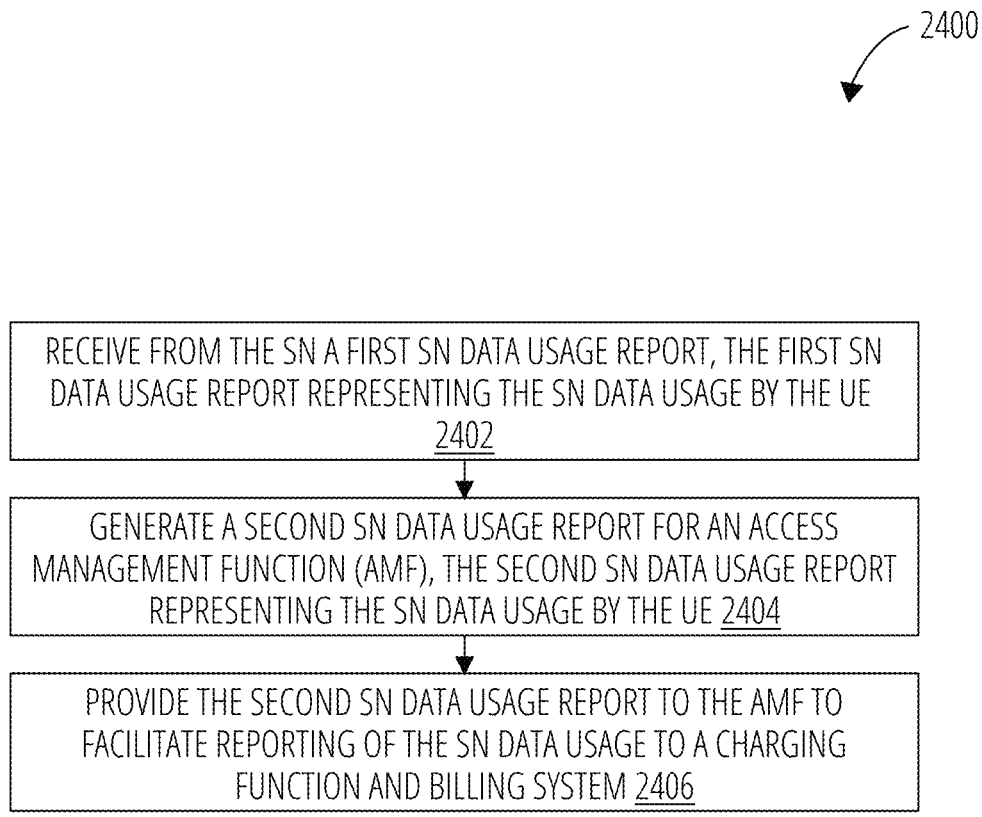
FIG. 24 is a flowchart of a process for billing different tariffs of a UE's data usage over FR1 and FR2 bands provided by the MN and the SN, respectively, in accordance with one embodiment.

FIG. 24 shows a process 2400, performed by an SN in an NR-DC cellular communication system (see, e.g., architecture 300 or architecture 600) including an MN, of reporting SN data usage for billing different tariffs of a UE's data usage over FR1 and FR2 bands provided by the MN and the SN, respectively. In a block 2402, process 2400 receives from the SN a first SN data usage report, the first SN data usage report representing the SN data usage by the UE. In a block 2404, process 2400 generates a second SN data usage report for an access management function (AMF), the second SN data usage report representing the SN data usage by the UE. In a block 2406, process 2400 provides the second SN data usage report to the AMF to facilitate reporting of the SN data usage to a charging function and billing system.

Figure 25:
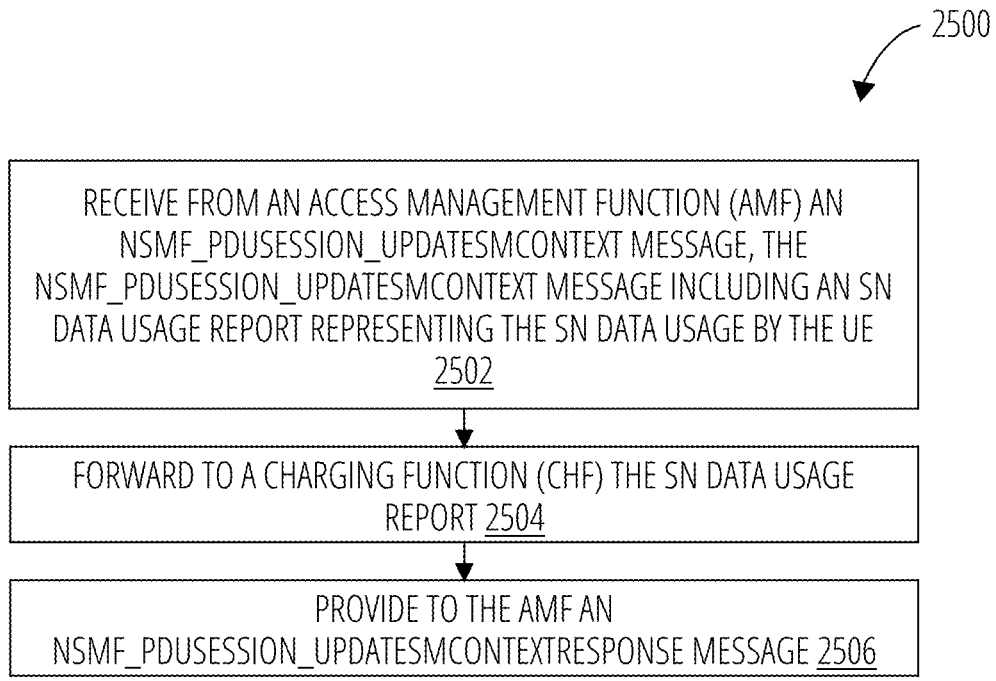
FIG. 25 is a flowchart of a process for billing different tariffs of a UE's data usage over FR1 and FR2 bands provided by the MN and the SN, respectively, in accordance with one embodiment.

FIG. 25 shows a process 2500, performed by an SMF in 5G core network of an NR-DC cellular communication system (see, e.g., architecture 300 or architecture 600) including an MN and an SN, of reporting SN data usage for billing different tariffs of a UE's data usage over FR1 and FR2 bands provided by the MN and the SN, respectively. In a block 2502, process 2500 receives from an access management function (AMF) an Nsmf_PDUSession_UpdateSMContext message, the Nsmf_PDUSession_UpdateSMContext message including an SN data usage report representing the SN data usage by the UE. In a block 2504, process 2500 forwards to a charging function (CHF) the SN data usage report. In a block 2506, process 2500 provides to the AMF an Nsmf_PDUSession_UpdateSMContextResponse message.

Figure 26:
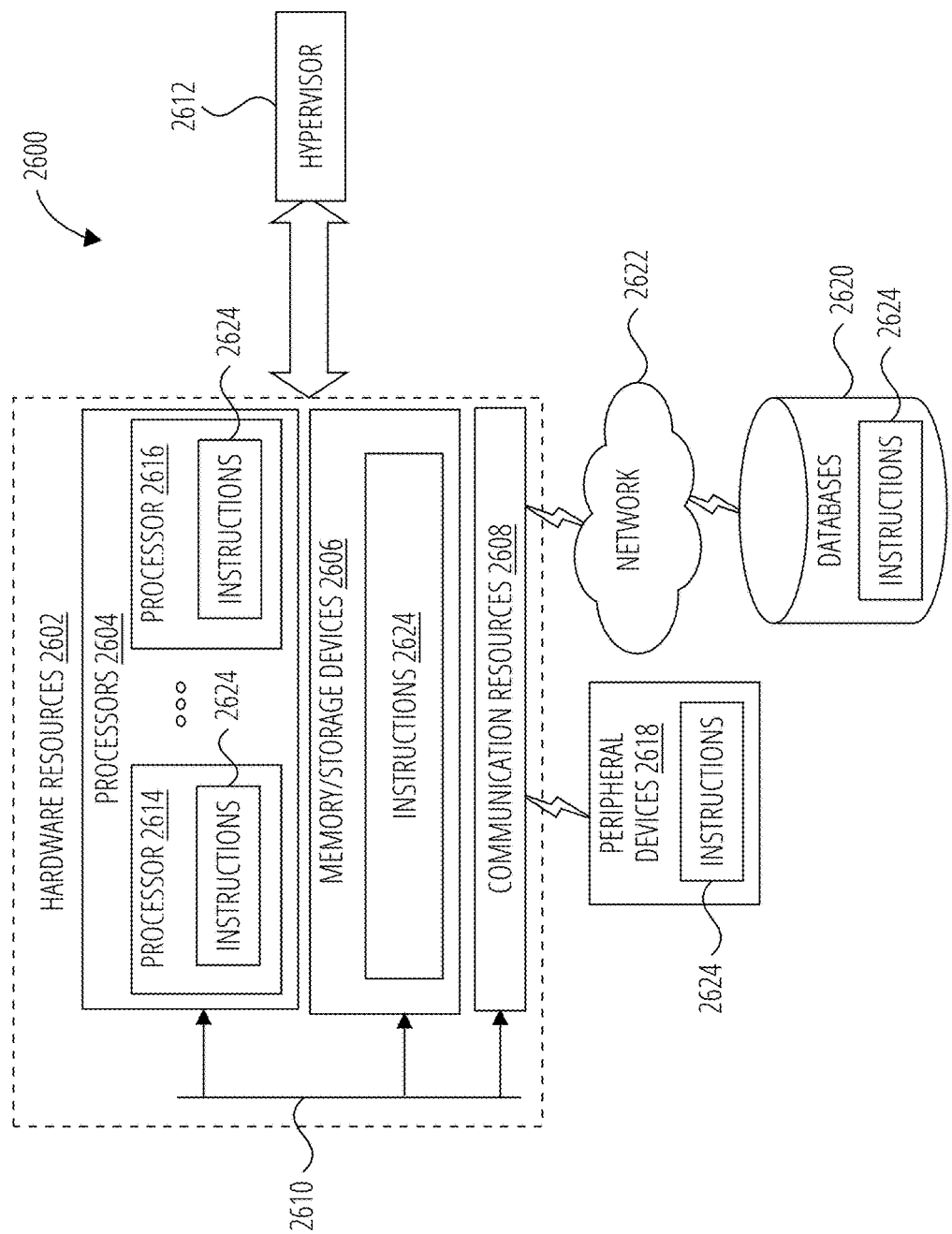
FIG. 26 is a block diagram of computing components for performing the disclosed procedures, in accordance with one embodiment.

FIG. 26 is a block diagram illustrating components 2600, according to some example embodiments, that are able to read instructions from a machine-readable or computer-readable medium (e.g., a non-transitory machine-readable storage medium) and perform any one or more of process 2300, process 2400, process 2500, or other techniques discussed herein. Specifically, FIG. 26 shows a diagrammatic representation of hardware resources 2602 including one or more processors 2604 (or processor cores), one or more memory/storage devices 2606, and one or more communication resources 2608, each of which may be communicatively coupled via a bus 2610. For embodiments where node virtualization (e.g., NFV) is utilized, a hypervisor 2612 may be executed to provide an execution environment for one or more network slices/sub-slices to utilize hardware resources 2602.

Processors 2604 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 2614 and a processor 2616.

Memory/storage devices 2606 may include main memory, disk storage, or any suitable combination thereof. Memory/storage devices 2606 may include, but are not limited to, any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

Communication resources 2608 may include interconnection or network interface components or other suitable devices to communicate with one or more peripheral devices 2618 or one or more databases 2620 via a network 2622. For example, communication resources 2608 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 2624 may comprise software, a program, an application, an applet, an app, or other executable code for causing at least any of processors 2604 to perform any one or more of the methods discussed herein. Instructions 2624 may reside, completely or partially, within at least one of processors 2604 (e.g., within the processor's cache memory), memory/storage devices 2606, or any suitable combination thereof. Furthermore, any portion of instructions 2624 may be transferred to hardware resources 2602 from any combination of peripheral devices 2618 or databases 2620. Accordingly, the memory of processors 2604, memory/storage devices 2606, peripheral devices 2618, and databases 2620 are examples of computer-readable and machine-readable media.

In light of this disclosure, skilled persons will appreciate that many changes may be made to the details of the above-described embodiments without departing from the underlying principles of the invention. The scope of the present invention should, therefore, be determined only by claims and equivalents.

What is claimed is:

1. A method, performed in a New Radio-New Radio Dual Connectivity (NR-DC) cellular communication system including a master node (MN) and a secondary node (SN), of reporting SN data usage for billing different tariffs of a UE's data-user equipment's (UE's) data usage over Frequency Range 1 (FR1) and Frequency Range 2 (FR2) bands provided by the MN and the SN, respectively, the method comprising:
   receiving, by the MN from the SN, a first SN data usage report, the first SN data usage report representing the SN data usage by the UE, the MN operating according to a same radio access technology (RAT) as the SN;
   generating, by the MN, a second SN data usage report for an access management function (AMF), the second SN data usage report representing the SN data usage by the UE; and
   providing, by the MN, the second SN data usage report to the AMF to facilitate reporting of the SN data usage to a charging function and billing system.

2. The method of claim 1, comprising sending, by the MN to the SN, an SN addition request or SN modification request including an SN data usage configuration to configure the reporting of the SN data usage.

3. The method of claim 2, in which the SN data usage configuration configures periodic reporting or event-based reporting.

4. The method of claim 1, in which the first SN data usage report represents the SN data usage per protocol data unit (PDU) session.

5. The method of claim 1, in which the first SN data usage report represents the SN data usage per quality of service (QOS) flow.

6. The method of claim 1, further comprising receiving, by the MN via an Xn interface with the SN, the first SN data usage report.

7. The method of claim 1, in which the MN and SN are central unit (CU) instances, and the method further comprises receiving, by the MN via an Xn application programming interface (API) with the SN, the first SN data usage report.

8. A method, performed by a secondary node (SN) in a New Radio-New Radio Dual Connectivity (NR-DC) cellular communication system including a master node (MN), of reporting SN data usage for billing different tariffs of a user equipment's (UE's) usage over Frequency Range 1 (FR1) and Frequency Range 2 (FR2) bands provided by the MN and the SN, respectively, the method comprising:
   receiving from the MN an SN data usage report configuration;

generating, based on the SN data usage report configuration, an SN data usage report for the MN, the SN operating according to a same radio access technology (RAT) as the MN; and providing the SN data usage report to the MN to facilitate reporting of the SN data usage to a core network.

9. The method of claim 8, in which the SN data usage report configuration is included in an SN addition request or SN modification request.

10. The method of claim 9, further comprising sending to the MN an SN addition request acknowledgement or SN modification request acknowledgement, the SN addition request acknowledgement or SN modification request acknowledgement indicating whether the SN data usage reporting is enabled at the SN.

11. The method of claim 8, in which the SN data usage report includes a protocol data unit (PDU) resource SN data usage list.

12. The method of claim 8, in which the SN data usage report represents the SN data usage per quality of service (QOS) flow.

13. The method of claim 8, in which the first SN data usage report represents the SN data usage per protocol data unit (PDU) session.

14. A method, performed in a New Radio-New Radio Dual Connectivity (NR-DC) cellular communication system including a master node (MN) and a secondary node (SN), of reporting SN data usage for billing different tariffs to a user equipment's (UE's) data usage over Frequency Range 1 (FR1) and Frequency Range 2 (FR2) bands provided by the MN and the SN, respectively, the method comprising:

receiving, by the MN from the SN, a first SN data usage report, the first SN data usage report representing the SN data usage by the UE;

generating, by the MN, a second SN data usage report for an access management function (AMF), the second SN data usage report representing the SN data usage by the UE;

providing, by the MN, the second SN data usage report to the AMF to facilitate reporting of the SN data usage to a charging function and billing system receiving, by a session management function (SMF) of a Fifth Generation (5G) core network of the NR-DC cellular communication system from the AMF, a first message, referred to as a N session management function protocol data unit session update session management context message (Nsmf_PDUSession_UpdateSMContext message), the Nsmf_PDUSession_UpdateSMContext message including the second data usage report representing the SN data usage by the UE;

forwarding, by the SMF to the charging function, the SN data usage report; and providing, by the SMF to the AMF, a second message, referred to as an N session management function protocol data unit session update session management context response message (Nsmf_PDUSession_UpdateSMContextResponse message).

15. The method of claim 14, in which the system attributes include an indication of one or more of a service area, user plane functions (UPFs) available in the serving area, a selected UPF and its UPF/SMF association (N4 association), user location, online/offline charging, charging function utilization, and traffic loading.

16. The method of claim 14, in which the SMF is a visited SMF (V-SMF), the method further comprising forwarding, by the SMF to the charging function, the SN data usage report by signaling a home SMF (H-SMF) with a third message, referred to as an N session management function protocol data unit session update request message (Nsmf_PDUSession_UpdateRequest message).

* * * * *